US006377825B1

(12) United States Patent
Kennedy et al.

(10) Patent No.: US 6,377,825 B1
(45) Date of Patent: Apr. 23, 2002

(54) HANDS-FREE WIRELESS COMMUNICATION IN A VEHICLE

(75) Inventors: Patrick J. Kennedy, Boulder; Ralph C. Poplawsky, Littleton; Charles W. Spaur, Aurora; Michael B. Durian, Boulder; David J. Farrell, Louisville, all of CO (US)

(73) Assignee: Cellport Systems, Inc., Boulder, CO (US)

( * ) Notice: Subject to any disclaimer, the term of this patent is extended or adjusted under 35 U.S.C. 154(b) by 0 days.

(21) Appl. No.: 09/507,175

(22) Filed: Feb. 18, 2000

(51) Int. Cl.[7] .............................. H04B 1/38; H04M 1/00
(52) U.S. Cl. ...................... 455/569; 455/563; 455/557; 455/90; 455/556
(58) Field of Search ................................. 455/569, 517, 455/88, 563, 90, 557, 575, 345, 550, 556; 379/454, 446, 428, 455, 449

(56) References Cited

U.S. PATENT DOCUMENTS

| 5,479,479 A | 12/1995 | Braitberg et al. | ............. 379/58 |
|---|---|---|---|
| 5,535,274 A | 7/1996 | Braitberg et al. | ........... 379/446 |
| 5,732,074 A | 3/1998 | Spaur et al. | ................ 370/313 |
| 5,822,427 A | * 10/1998 | Braitberg et al. | ............ 379/454 |
| 5,844,473 A | * 12/1998 | Kaman | ........................ 340/439 |
| 5,903,850 A | * 5/1999 | Huttunen et al. | ............ 455/557 |
| 6,198,947 B1 | * 3/2001 | Barber | ........................ 455/563 |

* cited by examiner

*Primary Examiner*—Nay Maung
*Assistant Examiner*—Eric D Lockett
(74) *Attorney, Agent, or Firm*—Sheridan Ross P.C.

(57) ABSTRACT

Wireless communications relative to a vehicle using a wireless communications device, a pocket for holding the wireless communication device and an interface module in communication with the pocket are provided. The pocket can include a processor for translating communications between the wireless communications device and the interface module. The interface module has processing capability and can communicate with different pockets and thereby different wireless communications devices. In at least one embodiment, the interface module manages voice recognition and text-to-speech commands to facilitate hands-free communications in the vehicle. The interface module can function as a communications hub involving a number of vehicle subsystems. In a preferred embodiment, the vehicle subsystems are separately addressable using the interface module and/or other processing hardware/software. However, in communicating over the Internet, a vehicle IP address is utilized.

21 Claims, 12 Drawing Sheets

HANDS-FREE WIRELESS COMMUNICATION IN A VEHICLE

FIELD OF THE INVENTION

The present invention relates to wireless communications systems. In particular, the present invention relates to a method and apparatus for providing hands free communications in a vehicle through any communication device capable of wireless communications.

BACKGROUND OF THE INVENTION

Wireless telephones, including cellular telephones have become increasingly popular as a means for persons to remain in telephone, data and messaging contact with others, even when away from their home or office. In particular, wireless telephones allow persons traveling in vehicles to place and receive telephone calls, data and messages even while moving at high rates of speed. As wireless telephone technology has advanced, the telephones themselves have become smaller and smaller and more feature rich. In addition, and in particular with the implementation of various digital technologies, the stand-by and talk times provided by battery operated telephones have increased. The decrease in telephone size, the increase in features and the improvements in the battery life of wireless telephones have made the battery-operated wireless telephone an increasingly common communication device.

However, the small size and battery operated configuration of many wireless telephones can be disadvantageous when such telephones are used in automobiles. In particular, the small size of such telephones can make dialing and other operations difficult. In addition, even with advanced battery compositions and power-saving strategies, the batteries of wireless telephones eventually need to be recharged. Finally, the configuration of most wireless telephones requires that they be held to the face of the user in order to use the speaker and microphone that are integral to the telephone.

In order to address some of the disadvantages associated with the use of portable wireless telephones in vehicles, various "car kits" are known. At a most basic level, these car kits provide an interconnection between the telephone and the electrical system of the vehicle. These simple systems therefore allow the telephone to be powered by the electrical system of the car, and also to charge the telephone's battery. Other "car kits" provide a cradle fixed to the interior of the vehicle for holding the telephone, and require that the telephone be lifted from the cradle for use. Other simple "car kits" combine the interconnection to the vehicle's electrical system and the cradle for holding the telephone in a single device. However, these basic systems require that the user of the telephone remove at least one hand from the vehicle's controls in order to operate the telephone, and that the user hold the telephone to his or her face during calls.

At a next level, some conventional "car kits" provide basic speaker phone functions. These systems provide a microphone and speaker, external to the telephone, and adapted for use at a distance from the user. Therefore, with such a system, a telephone call could be conducted without requiring that the telephone be held to the face of the user. In order to provide a speaker phone capability, the device must generally interface with proprietary electrical contacts provided on the exterior of the telephone. Generally, telephone manufacturers provide electrical contacts for supplying power and for the input and output of audio signals on the exterior of the telephone. Additionally, various contacts for access to and the provision of telephone control signals may also be provided. Through these contacts, it is possible to control various functions of the telephone.

However, adaptors for physically securing the telephone to the interior of the automobile, and for electrically interconnecting the telephone to the automobile and to processors for providing desired functionalities can be expensive. In particular, the cost of providing a hands-free control system in a vehicle to accommodate a number of different wireless telephones can be cost prohibitive because the physical and electrical characteristics of telephones vary by manufacturer and by model.

For the above-stated reasons, it would be advantageous to provide an improved method and apparatus for providing a hands-free wireless communications device in a vehicle. In addition, it would be advantageous to provide a method and apparatus that allows for a single interface module containing many of the components necessary to provide the desired functions that can be used with any of a plurality of pocket devices provided for interfacing with supported telephones. In addition, it would be advantageous to provide such a method and apparatus that i can be implemented at an acceptable cost, that allows the user to easily and economically expand the provided functions, and that is reliable in operation.

SUMMARY OF THE INVENTION

In accordance with the present invention, a system for providing hands-free wireless communications is provided. The disclosed system generally includes an interface module, a pocket or cradle and a wireless communications device. In general, the pocket is adapted to interface a particular wireless communications device or family of devices to a common interface module that may be functional with different pocket designs. The pocket and the interface module interact with the wireless communication device to economically provide for the hands-free operation of the wireless communication device.

A pocket in accordance with the present invention is adapted to be mechanically and electrically interconnected to a particular communications device or set of devices. Mechanical features of the pocket include surface features to allow the communications device to be held by the pocket and electrical connectors for mating with various electrical connectors provided with the communications device. Provisions for the electrical interconnection of the pocket and the communications device include, in addition to the above-mentioned electrical contacts, signal lines and processing capabilities. Accordingly, the pocket may provide for the passage of, e.g., radio frequency signals and digital data signals through the pocket without processing by the pocket. In addition, the pocket may include a processor for converting telephone control and other signals between the proprietary interface of the communications device and the application programming interface (API) of the system, allowing the pocket to pass telephone control and other information between the pocket processor and the interface module using a pocket-IM communications bus. Because the physical and electrical characteristics of communications devices such as wireless telephones varies, a pocket may be provided for each unique combination of physical and electrical characteristics found among supported communications devices.

The pocket is also adapted for mechanical and electrical interconnection to the interface module. The mechanical interconnection may include the provision of a common mounting system for joining the pocket and interface module together, including electrical contacts, or simply electrical contacts where the interface module is remotely located from the pocket. Electrical interconnections between the pocket and interface module may also be according to a common standard, and may include signal paths for various signals. At least some of the signals present between the pocket and the interface module may be formatted according to the above-mentioned API. According to an embodiment of the present invention, the interface module may be interconnected to any of a plurality of pockets.

The interface module generally contains a digital signal processor for sending and receiving commands transmitted over the pocket-IM communications bus, and for controlling other functions. For instance, the digital signal processor of the interface module may perform various signal processing functions to remove noise, as well as acoustic echos and line echos, from audio signals passed between the telephone and a speaker, as well as from a microphone to facilitate hands-free communications. The digital signal processor may also serve to interpret voice commands issued by a user concerning control of the system. Other potential functions of the interface module digital signal processor include wireless data processing or forwarding, the storage of voice memoranda, text to speech functions, and for interfacing the system to other communication devices, such as personal information managers (PIMs), GPS receivers, vehicle communications busses, Bluetooth devices, and other devices.

According to one embodiment of the present invention, the pocket in part controls access by a user to the functional capabilities of the system. Accordingly, a pocket may interconnect a communications device to an interface module in such a way that power may be supplied to the device, and audio communications passed to and from that device. However, the pocket may not allow for the recording of voice memoranda, even though the interface module may contain the processing, control and storage components necessary to provide that functionality. A second pocket may enable the user to access the voice memorandum recording capability of the interface module. Yet another, third pocket may additionally provide for the storage of voice memoranda in the pocket itself. Accordingly, this third pocket may allow a user to easily take recorded memoranda to, e.g., an interface module type device located in the user's home or office for playback of the memoranda. Still another pocket, used in combination with a suitable interface module, may enable a text to speech functionality. In this way, the system of the present invention allows a single model of interface module to optionally support a wide variety of communications devices and to provide a wide variety of functions. Therefore, the communications devices supported and the functional capabilities of the system can, at least in part, be determined by the pocket used as part of the system.

The system of the present invention allows a user to change, for example, his or her wireless telephone, while continuing to use the system, even where the physical and electrical characteristics of the new wireless telephone are different from the old, by purchasing a new pocket, while continuing to use the original interface module. In general, a user may gain access to additional capabilities by substituting a pocket enabling or providing a first set of capabilities for a pocket that enables or provides those additional capabilities. In this way, the system of the present invention enables a user to change his or her communications device without having to replace the interface module, and to upgrade the capabilities of the system by obtaining a pocket having the desired additional capabilities.

According to another embodiment of the system of the present invention, various models of interface modules may be available, allowing a user to determine the capabilities of the system at least in part by the interface module chosen. Accordingly certain interface modules may have less capabilities and be offered at a lower price than certain other interface modules that are more recent or that are more expensive but that offer expanded capabilities. Different models of interface modules may also be offered to provide or support new features. The various models of interface modules are preferably compatible, at least in part, with any pocket.

According to one embodiment of the system of the present invention, the system can provide a text to speech function to, for example, provide an audio output of textual data received by the communications device. This capability may be built into the interface module, or may be added to the interface module by the addition of a daughter board containing additional componentry to support the text to speech function.

The system is also capable of handling communications involving separately identifiable vehicle subsystems using processing or server functionalities of the interface module and/or associated daughter board. The vehicle having the vehicle subsystems has a unique IP address to allow communications over the Internet. In communications with the vehicle subsystem, the vehicle IP address is utilized outside the vehicle while, inside the vehicle, the communication can be mapped to, or otherwise associated with, the particular vehicle subsystem involved with the communication.

Additional advantages of the present invention will become readily apparent from the following discussion, particularly when taken together with the accompanying drawings.

DETAILED DESCRIPTION

Figure 1A:
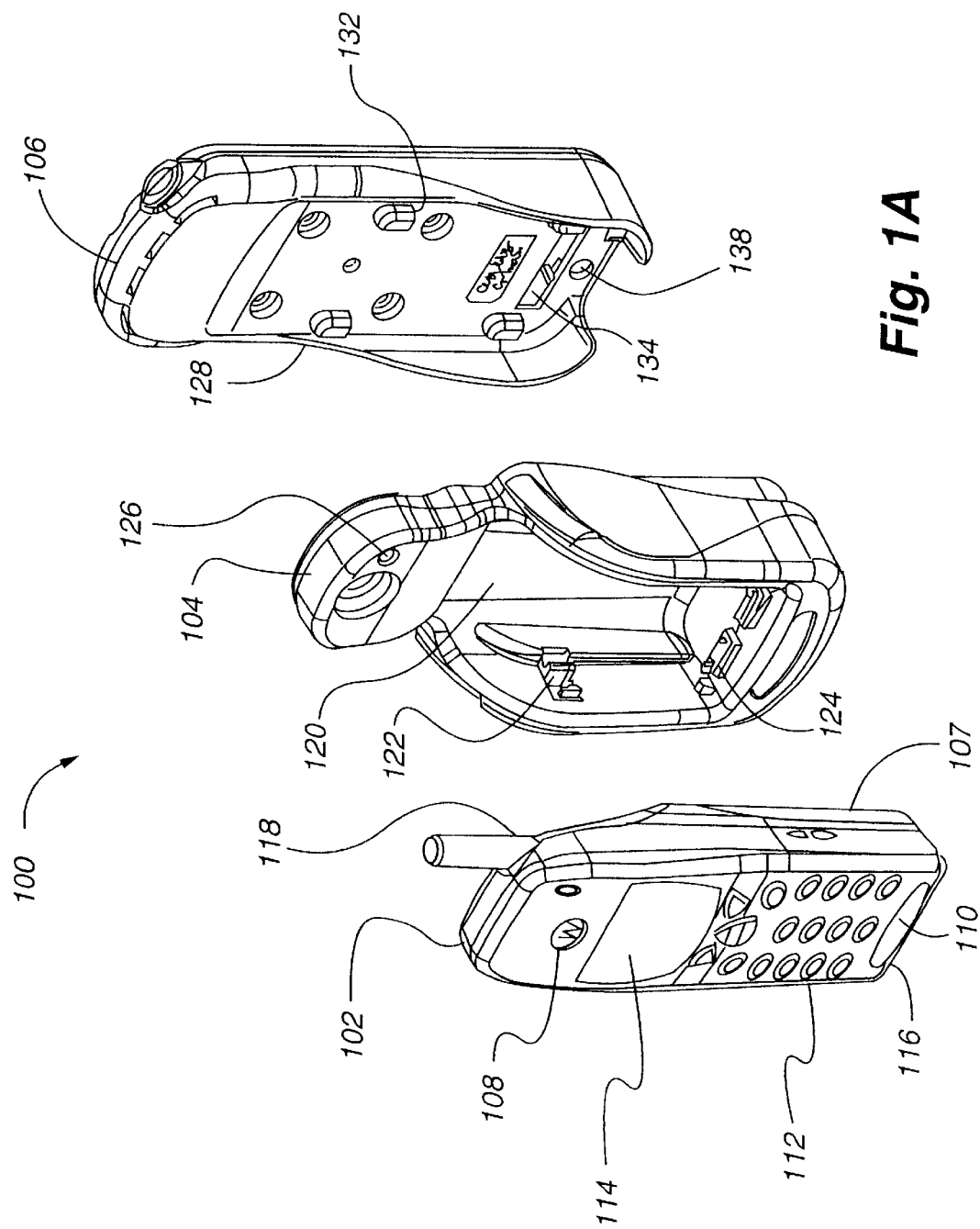
FIG. 1A illustrates a system for providing wireless communications in a vehicle according to an embodiment of the present invention.

With reference to FIG. 1A, an embodiment of a system 100 for providing wireless communications in a vehicle is depicted. The system 100 generally includes any communications device capable of wireless communications (e.g. wireless telephone) 102, a first holding assembly or pocket 104, and an interface module (IM) 106. The telephone 102 may have, or be compatible or otherwise operatively associated with, any current or future wireless technology, including, but not limited to, analog technologies such as the Advanced Mobile Phone System (AMPS), or digital systems such as a code division multiple access (CDMA) system, a time division multiple access (TDMA) system such as the Global System for Mobile Communications (GSM), a third generation (3G) system, such as wide band CDMA (W-CDMA), multicarrier CDMA, Time Division Duplex CDMA, or 3G EDGE (Enhanced Data Rates for GSM Evolution), or a combination of these and other air link technologies, such as the Bluetooth standard. In addition, the telephone 102 can be a wireless communications device other than a c wireless telephone, such as a satellite telephone, a radio, a software defined radio, a personal digital assistant, with or without wireless telephone capability or other service. In general, the telephone 102 is designed by its manufacturer to operate on batteries 107 and to be small in size to allow for easy portability. In addition, the telephone 102 generally features a built-in speaker 108 and microphone 110 to provide for the input and output respectively of audio signals when the telephone 102 is held to the head of the user.

The telephone 102 includes a keypad 112 to allow the user to dial numbers and to access the internal capabilities of the telephone 102, such as stored directories of telephone numbers, voice mail, paging or other features that may be provided by the telephone 102. User-defined functions such as directories of the telephone numbers may be stored in internal memory provided in the telephone 102. In addition, a typical telephone 102 includes a visual display 114 for displaying the number to be called or other information, such as the contents of a memory location or the number from which an incoming call originates. The telephone 102 will generally include baseband frequency amplifiers associated with the speaker 108 and the microphone 110. The telephone 102 also includes a radio frequency section for transmitting and receiving signals at the telephone's 102 operating frequencies. An electrical connector 116 is generally provided to allow the telephone 102 to be electrically connected to external devices. For example, the telephone 102 may be connected to an external power supply through the electrical connector 116. In addition, the connector 116 generally includes contacts for the transmission of control and data signals to the telephone 102. In some telephones 102, provision may also be made for the interconnection of a coaxial radio frequency cable to a radio frequency port 118, allowing the telephone 102 to utilize an external antenna.

The pocket 104 generally includes a recess 120 shaped to receive the exterior of the telephone 102. The recess 120 may include surface features 122, such as friction pads or protrusions shaped to mate with receiving features on the telephone 102, to mechanically interconnect the telephone 102 and the pocket 104. The pocket 104 is also provided with an electrical connector 124 that mates with the electrical connector 116 of the telephone 102 when the telephone 102 is properly positioned within the recess 120 of the pocket 104. The pocket 104 may also be provided with a coaxial connector 126 for interconnection with a coaxial connector 118 on the telephone 102. Therefore, the pocket 104 is electrically connected to the telephone 102 through the electrical connections 116 and 124 and the coaxial connectors 118 and 126.

Figure 2:
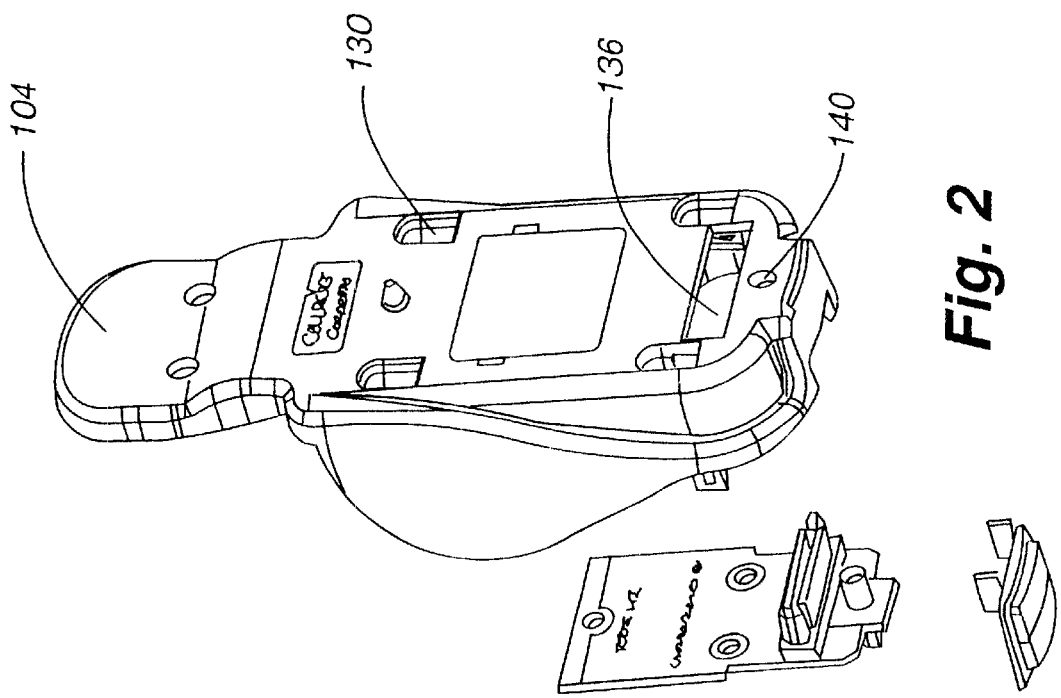
FIG. 2 is a rear perspective view of a pocket according to an embodiment of the present invention.
Figure 2:
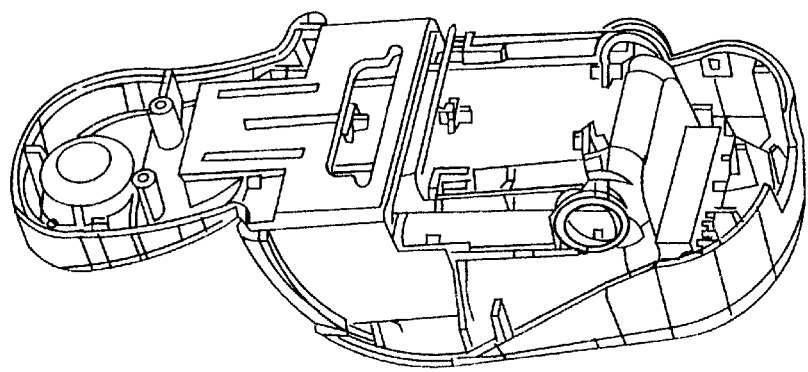

The interface module 106 includes locating protuberances 128 for receiving locating apertures 130 located on the back side of the pocket 104 (see FIG. 2). The locating protuberances 128, together with latch tabs 132 cooperate with the locating apertures 130 to mechanically interconnect the pocket 104 to the interface module 106. The interface module 106 also features an electrical connector 134 that mates with an electrical connector 136 located on the back of the pocket 104 (see FIG. 2). The interface module 106 additionally includes a coaxial connector 138 for connection to a cooperating coaxial connector 140 located on the back of the pocket 104 (see FIG. 2).

In the system of the present invention, the telephone 102 generally serves to transmit and receive radio frequency signals, and to demodulate and modulate those signals to and from the baseband frequencies (e.g., the audible frequencies or digital data communication frequencies). The telephone 102 then provides the baseband frequencies to the pocket 104 through the mating of the electrical connectors 116 and 124. The pocket 104 also holds the telephone 102 securely in place. The electrical connector 136, in cooperation with the electrical connector 134 on the interface module 106, completes the electrical interconnection of the telephone 102 to the interface module 106, and in turn to the vehicle. The interface module 106 also serves to mechanically interconnect the pocket 104, and in turn the telephone 102, to the vehicle, as the interface module 106 is generally rigidly affixed to the vehicle. The radio frequency connectors 118, 126, 138, and 140 also cooperate to carry radio frequency signals from the telephone 102 to an antenna mounted on the exterior of the vehicle. Therefore, in summary, the pocket 104 generally serves to mechanically and electrically interconnect the telephone 102 to the interface module 106 and in turn to the vehicle.

Figure 1B:
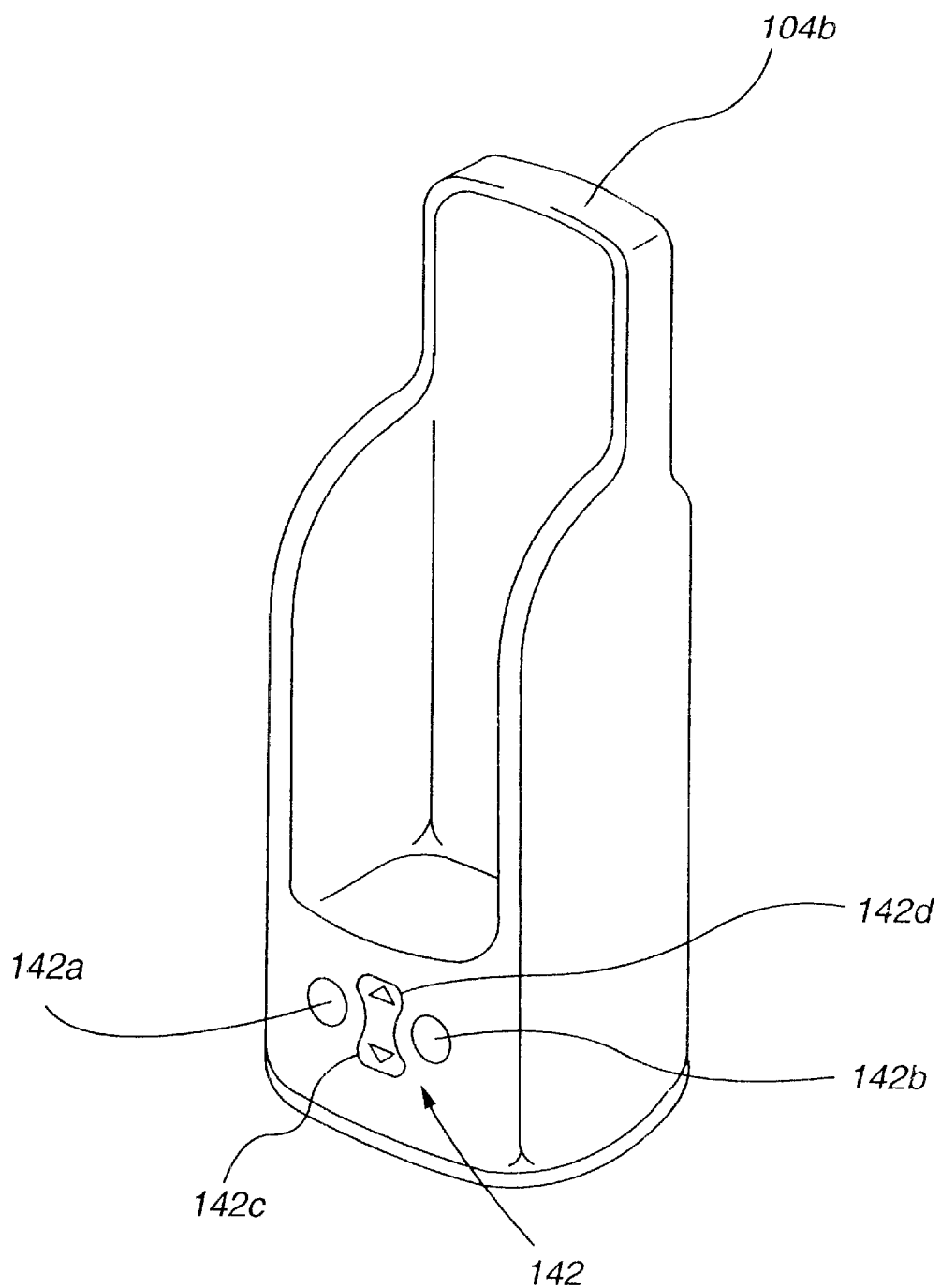
FIG. 1B illustrates a pocket according to another embodiment of the present invention.

Referring now to FIG. 1B, an alternative embodiment of the pocket 104 of the present invention is illustrated. According to the embodiment of the pocket 104 illustrated in FIG. 1B, a plurality of control buttons 142 are provided. The control buttons 142 allow the user to access certain advanced features of the pocket 104 provided with select embodiments of the system 100 and in particular of the pocket 104. These advanced functions will be discussed in detail below.

Figure 3:
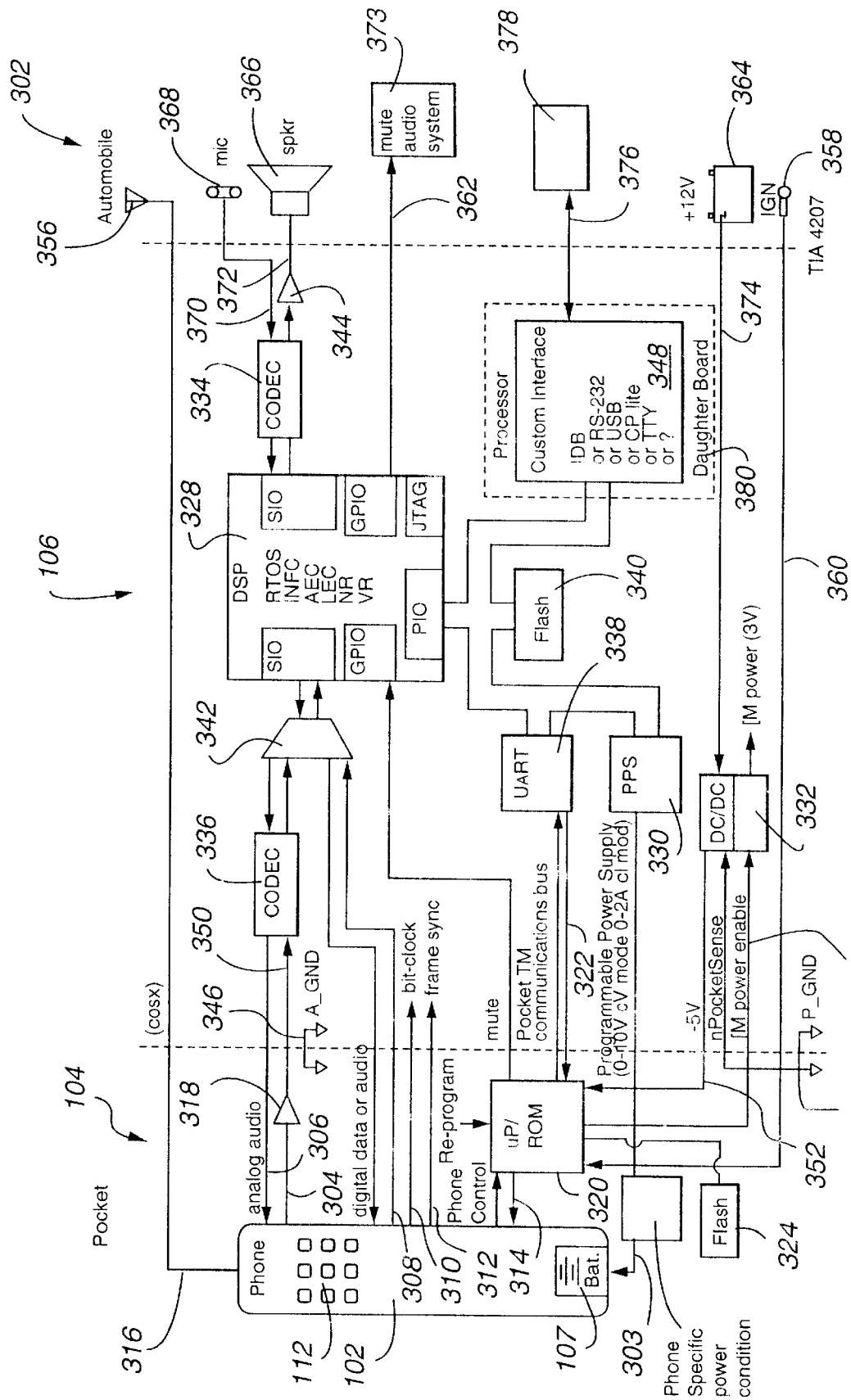
FIG. 3 is a schematic illustration of a system for providing wireless communications in a vehicle according to an embodiment of the present invention.

Referring now to FIG. 3, the major internal components of the telephone 102, the pocket 104, and the interface module 106, as well as relevant components integral to the automobile 302 are illustrated. As described generally above, the telephone 102 may provide various electronic signal paths. Therefore, the telephone 102 may accept power from an external source through a power supply line 303. The transmission of analog audio signals from the telephone 102 to the pocket 104 may be made through the analog audio output line 304, and analog audio signals may be transmitted from the pocket 104 to the telephone 102 through the analog audio input signal line 306. The telephone 102 may also be provided with one or more signal lines 308 for receiving and transmitting digital data or digital audio signals. Other signal lines that may be provided include a clock signal line 310, a frame synch signal line 312, and telephone control signal bus 314. Telephone control signals passed over the telephone control signal bus 314 may include signals to turn the telephone 102 on or off; to indicate that data is ready to be sent from the telephone, or that the telephone is ready to receive data; to request power or a change in power; to lock and unlock the telephone; to mute the telephone; to indicate an incoming call; to change the telephone language; to auto answer; to convey or request call timer information, current call status, call restriction data, telephone display data, calling number data, serial message data, cellular system information, or telephone system information; to request or control the telephone volume; to recall or write telephone numbers or other information from the telephone's memory; to simulate a telephone keypress; to dial a number; caller identification data; and to initiate the send command or the end command. All of the various electrical lines 303, 304, 306, 308, 310, 312 and 314 may be a part of the electrical connector 116 on the exterior of the telephone 102. The telephone 102 may also be provided with a radio frequency signal line 316 in the form of the coaxial connector 118.

As described above, the pocket 104 is provided with an electrical connector 124 for electrically interconnecting the pocket 104 to the telephone 102. Some of the electrical signals passing through the connector 124 are simply carried through the pocket 104 to the electrical connector 136, and thereby are passed on to the interface module 106 directly. Other of the signals are manipulated or processed within the pocket 104. For example, the analog audio output signal 304 is amplified in the pocket 104 by an analog audio amplifier 318. In addition, a microprocessor 320 processes telephone control signals on the telephone control signal bus 314 that are passed between the telephone 102 and the pocket 104, and communication on the pocket-IM bus 322 passed between the pocket 104 and the interface module 106. Pocket memory 324 may be associated with the microprocessor 320. The pocket memory 324 may be any addressable storage space, such as ROM, RAM, EEPROM, flash memory, or a combination of memory types. All or a portion of the memory 324 may be removable from the pocket 104. The pocket 104 also includes a ground signal 326 for signaling to the interface module 106 through electrical connectors 134 and 136 the presence or absence of the pocket 104.

The interface module 106 includes processing hardware and software including at least one microprocessor and/or a digital signal processor 328, a programmable power supply 330, a DC to DC power converter 332, a near-end coder/decoder (CODEC) 334, a far-end CODEC 336, one or more universal asynchronous receivers/transmitters 338 (UART), and IM memory 340. The IM memory 340 may be any addressable storage space, such as ROM, RAM, EEPROM, flash memory or a combination of memory types. All or a portion of the memory 340 may be removable from the interface module 106. The interface module 106 also includes a multiplexer 342, an analog audio amplifier 344, and ground lines 326 and 346 for establishing a common ground between the pocket 104 and the interface module 106. The interface module 106 may additionally include an interface 348 for interconnecting the interface module 106 to various external subsystems 378. The interface 348 may conveniently be mounted to a daughter board 380 to facilitate expanding the capabilities of the interface module 106. The daughter board may also have a microprocessor including server capabilities. Instead of such a daughter board 380, all of its capabilities and the interface module components and their functionalities could be integrated on a single chip. In general, the provision of the interface 348 allows the interface module 106 to serve as a communications hub for various external subsystems 378. These external subsystems 378 may include personal computers, auto PCs, Global Positioning System (GPS) units, Personal Digital Assistants (PDA); devices for the storage of digital audio for playback through the automobile's stereo, such as devices storing music in the MP3 format; the data network or communications bus of vehicles, such as a controller area network (CAN), other data network or communications busses, visual displays; devices using the Bluetooth communications protocol or some other communications protocol; or other electronic systems. In connection with possible implementation of Bluetooth technology, such may be integrated with the interface module 106, as well as being incorporated with the pocket 104. In such a case, the Bluetooth technology need not be part of the wireless telephone 102 or other wireless communication device. According to this embodiment, the pocket 104 and the interface module 106 could cooperatively function to provide services for associated Bluetooth devices. In this configuration, the number of signal conducting wires is substantially reduced. However, one or more wires may be necessary or appropriate for providing charging functions and/or providing an external antenna connection.

With respect to facilitating communications with the vehicle having the wireless communications device 102, particularly communications to vehicle subsystems 378 using the Internet, the vehicle subsystems 378 can be configured to be separately accessible. These individualized communications are achieved, preferably not by assigning separate Internet protocol (IP) addresses to each of the vehicle subsystems 378, but by incorporating an address-related mapping technique. In accordance with the preferred embodiment, the particular vehicle has only one IP address, or at least the number of IP addresses associated with the vehicle and vehicle subsystems is less than the total number of vehicle subsystems. In the case in which the vehicle has only one IP address, it is necessary to be able to direct the received communication to the desired vehicle subsystem. This can be accomplished by assigning or correlating ports or other identifiers to each of the vehicle subsystems for which there is interest in allowing such communication. When a communication is received for a designated vehicle subsystem 378, the interface module 106 and/or associated daughter board 380 functions to map the contents of the received communication to the port or other identifier associated with a particular vehicle subsystem 378 that is to be the recipient of this communication. In a preferred embodiment in which it is desirable to communicate with a number or a fleet of vehicles from a common site outside the vehicle, each of the vehicles in the fleet would be assigned a separate IP address. However, the identifiers or ports associated with each of the vehicle subsystems in this fleet would have the same or corresponding port or other identifier. For example, vehicle subsystem 1 in vehicle 1 would have the same port number or other identifier as vehicle subsystem 1 in vehicle 2, although the IP addresses of vehicle 1 and vehicle 2 would be different. This configuration is highly beneficial in managing fleet vehicles, particularly sending/receiving information relative to each of a number of vehicle subsystems in a large number of vehicles. Relatedly, such configuration makes it easier to identify and locate each of the vehicle subsystems in a fleet since the same vehicle subsystem 378 in one vehicle has the same identifier as an identical vehicle subsystem in another vehicle in the fleet.

With regard to sending a first communication to a first vehicle subsystem located in a first vehicle, a communication can be prepared at a site remote from the vehicle. The communication packet includes an IP address for the first vehicle. The communication packet also includes address-related (e.g. port) information or other identifying information associated with the first vehicle subsystem that is to receive this first communication packet. The first communication packet is transmitted over the Internet to the first vehicle having the IP address in the communication packet. This communication packet is then received by the wireless telephone or other wireless communication device 102. Subsequently, a determination is made regarding the ultimate location or vehicle subsystem recipient of the first communication packet. This determination might be made by processing hardware and software in the interface module 106 and/or other processing hardware/software including possibly a server on the daughter board 380. As part of the processing or determination procedures, mapping or other correlation can be provided between the information in the first communication packet related to identifying the particular vehicle subsystem that is to receive the communication packet and a port or other identifier associated with this vehicle subsystem. After the mapping is completed, the communication packet can be directed to the determined first vehicle subsystem, which was designated as the recipient of this communication. As can be appreciated, in the case in which the same communication is to be sent to the same vehicle subsystem located in a number of vehicles in a fleet, only the IP address for each vehicle need be changed to its dedicated vehicle IP address. As can be further appreciated, when it is desirable to send a communication to a second vehicle subsystem located in the first vehicle, either at the same time or at different times, the same IP address associated with that first vehicle can be utilized, while the mapping function to enable the communication to be received by the second vehicle subsystem can be handled within the vehicle.

Similarly, in communicating from the vehicle to the site outside the vehicle, such as a common site associated with sending/receiving communications to/from a fleet of vehicles, and involving the transmission of data or other information from one or more vehicle subsystems in the vehicle, the network address translation (NAT) can also be accomplished. In particular, the server or other processing hardware/software conducts an address translation by which the vehicle IP address is provided before the communication is sent over the Internet. Such a communication could also include identifying information that identifies the accompanying data as emanating from the particular vehicle subsystem. Consequently, the communication to the site outside the vehicle is accomplished using a single IP address, regardless of which vehicle subsystem might be providing data to the site over the Internet.

Additionally, the interface module 106 is provided with various signal paths for interconnecting the interface module 106 to the pocket 104 and the vehicle or automobile 302. Signal paths between the pocket 104 and the interface module 106 include the analog audio input signal path 306 and the amplified analog audio output signal path 350. Digital data signal paths 308 and clock 310 and frame synch 312 signal paths may also be provided between the pocket 104 and the interface module 106. The pocket-IM communications bus 322 also runs between the pocket 104 and the interface module 106. The bus 322 may be a serial bus or any other appropriate bus. Various power lines may also run between the pocket 104 and the interface module 106, such as the telephone power supply line 303 and the pocket power line 352. The interface module power enable line 354 connects the microprocessor 320 of the pocket 104 to the DC to DC power convertor 332 in the interface module 106. The ground 326 and pocket sense 346 lines also pass between the pocket 104 and the interface module 106. Radio frequency signals are passed through the interface module 106 from the pocket 104 to an antenna 356 mounted on the automobile 302 over the radio frequency signal line 316. Additionally, a signal indicating the position of the automobile's 302 ignition switch 358 is passed through the interface module 106 to the microprocessor 320 of the pocket through the ignition signal line 360.

Signal paths between the interface module 106 and the automobile 302 include the radio frequency signal line 316, which passes from the phone 102, through pocket 104 and the interface module 106 to the antenna 356 on the automobile 302. In addition, near-end audio input 370 and audio output 372 lines connect the near-end CODEC 334 to the microphone 368 and the speaker 366, respectively. The audio output line 372 passes through an analog audio amplifier 344 before continuing on to the speaker 366. The mute line 362 connects the interface module microprocessor 328 to the entertainment system 373 of the automobile 302. The main power line 374 connects the DC to DC power convertor 332 of the interface module 106 to the electrical power supply 364 of the automobile 302. The ignition signal line 360 passes through the interface module 106, between the microprocessor 303 of the pocket 104 and the ignition switch 358 of the automobile 302. Additionally, one or more custom interface signal lines 376 may connect the interface 348 of the interface module 106 to various other subsystems 378 located in the automobile 302.

As a result of the above-mentioned signal paths, in addition to being mechanically interconnected to the automobile 302, the interface module 106 is electrically connected to certain of the automobile's 302 components. Therefore, the interface module 106 may be interconnected to an antenna 356 provided on an exterior of the automobile 302. Also, the interface module 106 is interconnected to the electrical power supply 364 of the automobile 302, and may also be connected to the ignition switch 358 of the automobile 302 to signal operation of the system 100 when the automobile 302 is running. Speakers 366 located within the automobile 302 may conveniently be utilized by the system 100 to provide an audible signal from the telephone 102. The speakers 366 may or may not be a part of the automobile's 302 audio entertainment system 373. Also, the speakers 366 may be part of a headset worn by the user. For receiving audible signals (e.g. the voice of a user), a microphone 368 may be located within the interior of the automobile 302, and that signal processed by the interface module 106 and provided to the telephone 102 via the pocket 104. The interface module 106 of the system 100 may also be interconnected to the audio system 373 of the automobile 302 to mute signals other than those transmitted from the telephone 102 to the speakers 366.

Figure 4A:
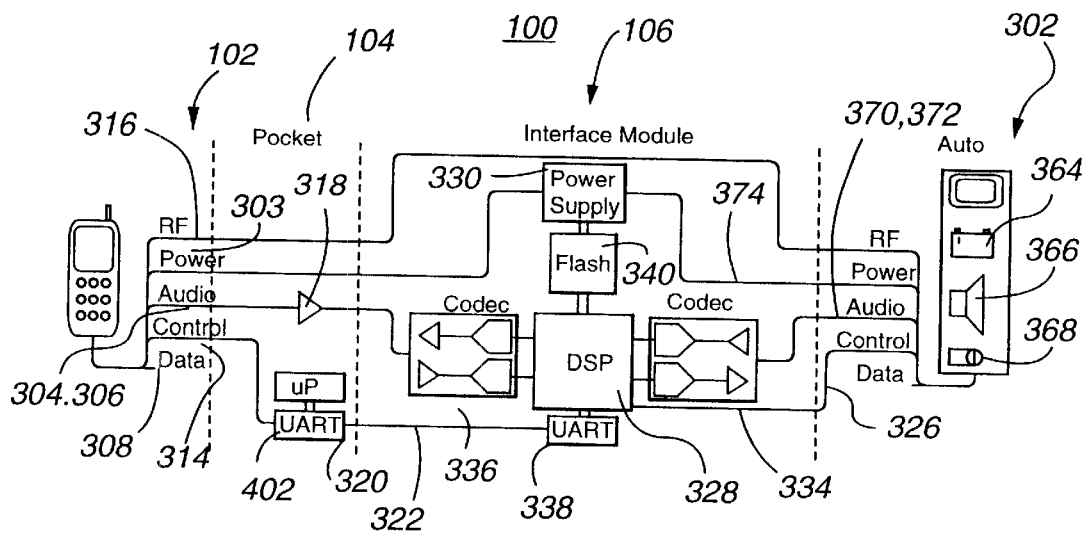
FIG. 4A is a schematic representation of a system for providing wireless communications in a vehicle according to an embodiment of the present invention.
Figure 4B:
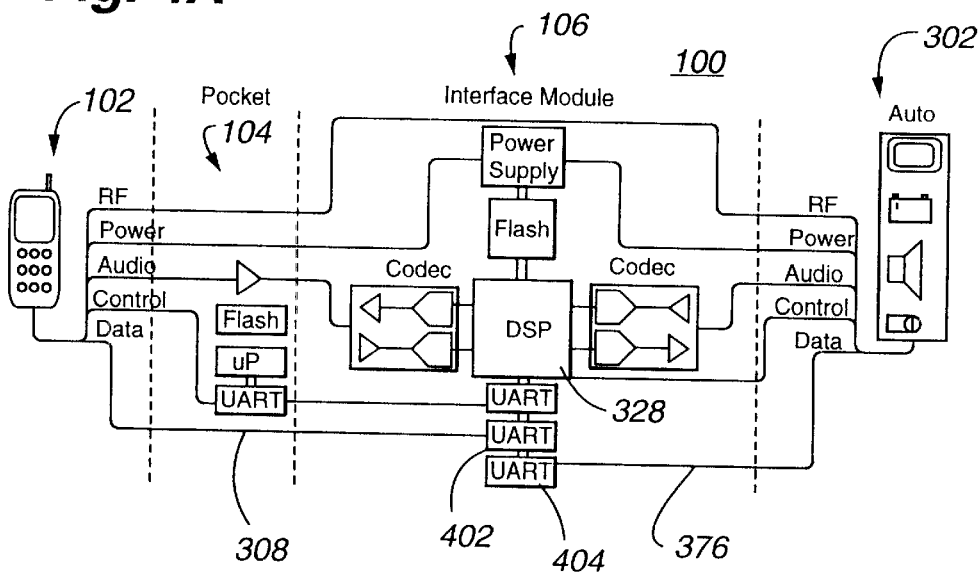
FIG. 4B is a schematic representation of a system for providing wireless communications in a vehicle according to another embodiment of the present invention.

Preferably, the system 100 is provided in a variety of models offering differing capabilities to suit the needs and budgets of individual users. These differing capabilities are provided by varying the functionality supported by the pocket 104 and/or the interface module 106. Referring now to FIGS. 4A and 4B, embodiments of the system 100 having differing capabilities are illustrated schematically.

With reference now to FIG. 4A, a telephone 102, pocket 104, interface module 106, and automobile 302 of an embodiment of the system 100 are illustrated schematically.

With respect to the telephone 102, the radio frequency 316, power 303, audio 304 and 306, control 314, and digital data signal lines 308 are illustrated. It is noted that, while the digital data path 308 is shown at the telephone 102, it is not passed through the pocket 104 to the interface module 106. This is because the embodiment of the pocket 104 illustrated in FIG. 4A does not support digital data signals 308, and thus does not provide a digital data line.

The pocket 104 of the embodiment illustrated in FIG. 4A includes signal paths for the radio frequency 316 and power 303 signals. For at least the incoming analog audio signal, an amplifier 318 is provided. Telephone control data line 314 is interconnected to the microprocessor 320 located in the pocket 104. Therefore, it can be seen that, in the embodiment shown in FIG. 4A, the pocket 104 provides interconnections to all of the telephone's 102 electrical inputs and outputs, except for those outputs for digital data or digital audio.

The pocket 104 of the embodiment shown in FIG. 4A amplifies audio signals provided from the telephone 102, and includes a microprocessor 320 for providing an interface for control data 314 passed between the telephone 102 and the interface module 106. As illustrated in FIG. 4A, a universal asynchronous receiver transmitter (UART) 402 may be associated with the microprocessor 320 for aiding the transmission of flow control data between the telephone 102 and the pocket 104. In one embodiment, a single UART 402, which is part of the microprocessor 320, is provided on the pocket 104 side of the telephone control signal path established between the pocket 104 and the interface module 106. Because a UART 338 is provided in the interface module 106, no additional UART is necessary. By eliminating an additional UART, the cost of the pocket 104, and in particular the cost of the microprocessor 320, can be kept to a minimum. However, in certain applications, such as those in which the interface module 106 is located at a distance from the pocket 104, it may be necessary to provide an additional line driver in the pocket 104.

The interface module's 106 major components are shown in FIG. 4A as the interface module microprocessor 328, the power supply 330, the near-end 334 and far-end 336 CODECs, the UART 338, and the IM memory 340. The interface module 106 is also illustrated as providing a signal path for the radio frequency signal 316. The interface module microprocessor 328 provides a variety of advanced functions that will be described in greater detail below. The power supply 330 provides a constant voltage or a constant current, according to the requirements of the particular telephone 102, for powering the telephone 102 and charging the telephone's 102 battery 107. The CODECs 334 and 336 provide for the conversion of analog audio signals to digital signals that can be processed by the interface module microprocessor 328, and likewise convert digital audio signals emanating from the interface module microprocessor 328 into analog signals usable by the analog audio inputs of the telephone 102 or the speakers 366 of the automobile 302. As described above with respect to the pocket 104, the UART 338 of the interface module 106 facilitates the communication of telephone 102 control data between the pocket 104 and the interface module 106 across the pocket-IM bus 322. The IM memory 340 allows voice memos or other data to be stored in digital form. In addition, the IM memory 340 may be used to store word models and voice prompts used to support voice recognition features. As an additional function, the IM memory 340 may be used to correct errors in the code resident in the interface module microprocessor 328.

The automobile 302 is, in the embodiment illustrated in FIG. 4A, shown as being connected to the radio frequency 316, power 374, audio 370 and 372 and control 362 line. However, the data line 308 is not shown as being interconnected to the data line 308 of the telephone 102. This is because the pocket 104 of the embodiment makes no provision for transmitting such data 308 to or from the telephone 102.

Referring now to FIG. 4B, a telephone 102, pocket 104, interface module 106, and automobile 302 of yet another embodiment of the system 100 are illustrated schematically. The system 100 illustrated in FIG. 4B includes all of the various signal lines and structures described above with respect to the embodiment illustrated in FIG. 4A. However, in addition, the embodiment illustrated in FIG. 4B includes a digital data line 308 from the telephone 102 through the pocket 104 to a second UART 402 located in the interface module 106. The second UART 402 of the interface module 106 is connected to a third UART 404 in the interface module 106. The interface signal line 376 runs between the third UART 404 of the interface module 106 and the automobile 302. Thus, the embodiment of the system 100 illustrated in FIG. 4B provides a direct path for digital data or audio from the telephone 102 to the interface module 106, including the interface module microprocessor 328, and from the interface module 106 to the automobile 302. The provision of these digital data lines 308 and 376 allows the system 100 to support additional features, as will be described in greater detail below.

Figure 5:
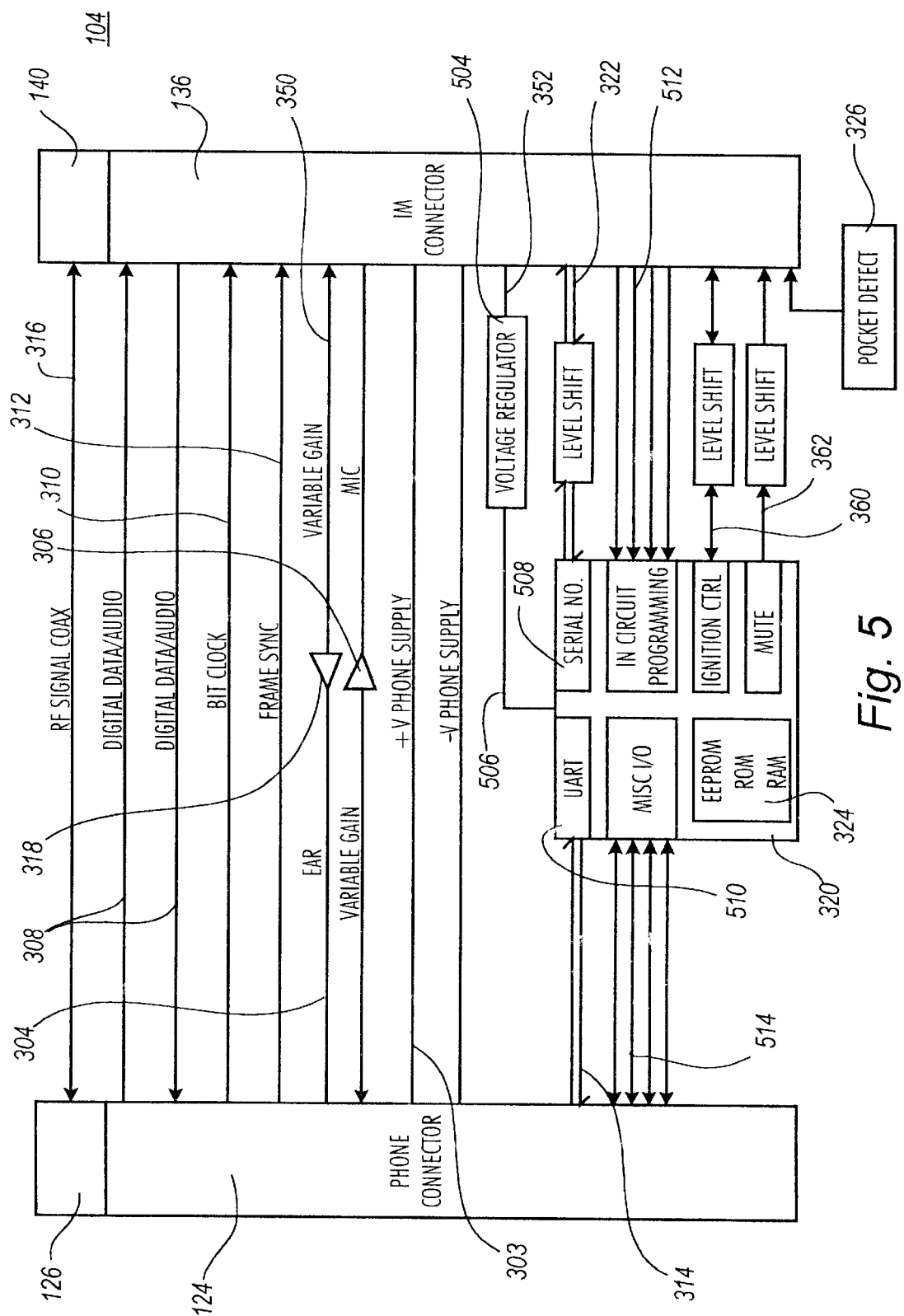
FIG. 5 is a schematic illustration of a pocket according to an embodiment of the present invention.

Referring now to FIG. 5, an embodiment of the pocket 104 of the present invention is illustrated schematically. As shown in FIG. 5, the pocket 104 generally includes an electrical connector 124 for providing electrical connectivity between the pocket 104 and the telephone 102. Additionally, a radio frequency connector 126 may be provided for the transmission of radio frequency signals across the pocket 104 to the interface module 106. The radio frequency signal line 316 thus travels between the radio frequency connector 126 at the interface of the telephone 102 and the pocket 104, and the radio frequency connector 140 at the interface of the pocket 104 and the interface module 106. An electrical connector 136 provides other electrical connections between the pocket 104 and the interface module 106. As discussed above, digital data lines 308 can be provided in the pocket 104 to pass digital data or digital audio signals directly from the telephone 102 to the interface module 106, without manipulation by componentry within the pocket 104. Other signal lines that are provided for transmission of signals across the pocket 104 without manipulation by the pocket 104 are the clock signal line 310 and the frame synch signal line 312. Also, one or more power supply lines 303 transmit power from the interface module 106 directly to the telephone 102.

As discussed above, an analog audio amplifier 318 receives analog audio signals from the telephone 102 over the analog audio analog output line 304. The analog signals received at the amplifier 318 are then amplified a selected amount and passed to the interface module 106 over the amplified analog output line 350. Also shown in FIG. 5 is an analog audio input amplifier 502 which may be provided to selectively amplify analog audio signals from the interface module 106 before they are passed to the telephone 102 over analog audio input line 306.

A voltage regulator 504 may be provided in the pocket 104 for providing the correct voltage level to power the microprocessor 320. For example, the voltage regulator 504 may take a 5 volt signal supplied by the DC to DC power convertor 332 in the interface module 106 over power line 352, and produce a 3 volt output. The 3 volt output may then be supplied to the microprocessor 320 over regulated power supply line 506.

The signals provided from the interface module 106 through the electrical connector 136 to the pocket 104 include communication signals transmitted over the pocket-IM communication bus 322. The communication bus 322 terminates in the microprocessor 320 at serial input/output pins 508. As will be described in greater detail below, the communication signals received at the serial I/O pins 508 are decoded before being sent to the microprocessor UART 510 for transmission to the telephone 102 over the telephone control lines 314. Other signal lines passing between the interface module 106 and the pocket 104 include a plurality of in-circuit programming signal lines 512, which may be used to program or re-program the pocket microprocessor 320. The ignition signal line 360 and mute line 362 are also provided. Additional I/O signal lines 514 may be provided between the microprocessor 320 and the telephone 102. A pocket detect ground 326 for interconnection to the interface module 106 is also provided. Additionally, memory 324 may be provided in the pocket 104 for use in association with the microprocessor 320. According to one embodiment of the pocket 104, the microprocessor 320 includes inputs for receiving signals from buttons 142 (see FIG. 1B) on the exterior of the pocket 104.

As mentioned above, the telephone 102 may generally be used to transmit and receive voice and data signals over an air link to a base station, such as a cell in a cellular phone system. Additionally, the telephone 102 will typically allow for the storage of indexed lists of phone numbers to provide the user with a customized list or directory of telephone numbers. The telephone 102 is also provided with a speaker 108 and microphone 110 to allow the user to engage in conversations over the telephone 102 when the telephone 102 is held to the face of the user. A keypad 112 is typically used to enter numbers and initiate dialing, answer incoming calls, and to enter phone directory information. A visual display 114 is also typically provided for displaying the number to be called, memory location entries, or other information. The phone 104 may be powered by a battery 107 so that the telephone 102 is easily portable.

However, the telephone 102 is typically not provided with features allowing for easy hand held use in an automobile. For instance, placing a call typically requires the user to enter the number using the keypad 112, or again using the keypad 112, to select from an entry in a user-defined directory. Using the keypad requires that the user remove his or her eyes from the road to view the keypad 112 and the display 114, and to remove a hand from the automobile's 302 controls to enter the number or select the desired option. This is, of course, disadvantageous where the user is driving the automobile 302. Although some telephones 102 are available with built-in voice recognition features, they are "near talk" systems, and are not well suited for use in vehicle or other "far talk" environments. Therefore, it is desirable to provide a system to allow the reliable hands-free operation of the telephone 102.

As can be appreciated, the telephone 102 may be produced by any one of a number of manufacturers, who each may produce a variety of different models. Accordingly, the physical shape of the telephone 102, as well as the physical configuration of the electrical connector 116 and the particular signal lines provided by the electrical connector 116 may vary greatly. Additionally, the communications protocol recognized by the telephone 102 is generally proprietary to the manufacture of the telephone 102 and may vary among telephone models 102 produced by a single manufacturer.

In order to accommodate the variety of physical, electrical, and communications protocol variations among telephones 102, the present invention provides a plurality of different pocket 104 configurations. Thus, a pocket 104 may be provided to mate with the various physical configurations of different telephones 102. Accordingly, the recess 120 and surface features 122 are generally determined by the physical characteristics of the telephone 102 meant to be accommodated by the particular pocket 104. In addition, the electrical connector 124 is physically configured to mate with the electrical connector 116 on the telephone 102. Where the telephone 102 provides a coaxial connector 118 for a radio frequency signal line, the pocket 104 may provide a mating coaxial connector 126. In this way, a particular telephone 102 may mechanically mate with the corresponding pocket 104.

As mentioned above, the particular electrical signal lines provided by telephone 102 and the communications protocol used by the telephone 102 may vary between manufacturers, and even among the various models of telephones 102 produced by a particular manufacturer. Therefore, in order to electrically connect the telephone 102 to the pocket 104 and the interface module 106 and in turn the automobile 302, provisions must be made to accommodate these differences. Accordingly, the pocket 104 may be designed to accommodate the particular configuration and type of electrical signal lines provided by the telephone 102. In a physical sense, this is done by connecting the provided signal lines (e.g. 304, 306, 308, 310, 312, 314, 303 and 316) to the corresponding contacts, if so provided, in the electrical connector 116 and 118 of the telephone 102.

Additionally, the pocket 104 is provided with a microprocessor 320 and associated pocket memory 324 for interfacing with the provided telephone control signals 314 of the telephone 102. In this way, the electrical and communications protocols of the telephone 102 can be accommodated by the particular pocket 104 designed for use with the particular telephone 102. Specifically, the memory 324 of the pocket 104 contains code that allows the pocket 104 to translate between commands formatted in the API of the system 100 and the proprietary communications interface of the telephone 102. Although the pocket 104 is physically and electrically configured for use with particular telephones, it is desirable that the interface module 106 be capable of operating with any of the provided pockets 104 and associated telephones 102. Providing a common interface module 106 may reduce the cost of the system 100, as only the pocket 104 need be varied to accommodate the wide variety of telephones 102 available in the marketplace. To further increase the advantages gained by using a common interface module 106, many of the components necessary to provide the functions of the system 100 are located in the interface module 106. Conversely, the number and cost of components necessary for the pocket 104 to provide the desired functions are kept to a minimum. In addition, although the interface module 106 may be capable of carrying out a certain number of functions, all of these functions may not be available to a user who has a pocket 104 that allows access to only a limited number of the potentially available functions. Also, the functions supported by a particular pocket 104 may be varied according to the operational functions available using the particular telephone 102 or according to the functions supported by the particular pocket 104.

Figure 6:
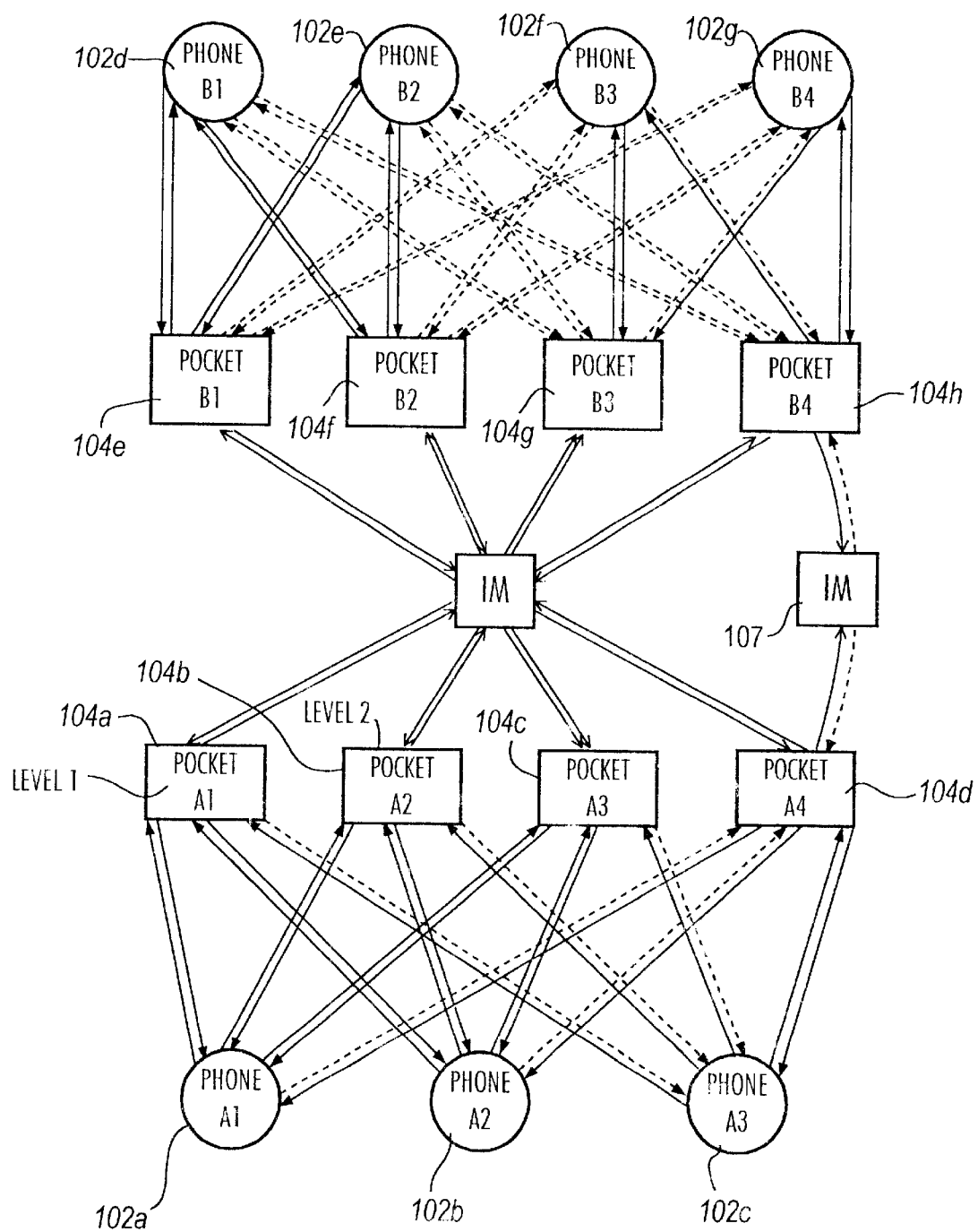
FIG. 6 illustrates functional compatibilities between components of a system for providing wireless communications in a vehicle according to an embodiment of the present invention.

With reference now to FIG. 6, a plurality of pockets 104a, 104b, 104c, 104d, 104e, 104f, 104g and 104h are shown, each having differing physical and/or functional compatibilities, but that are all physically and functionally compatible with a common interface module 106. The pockets A1 104a, A2 104b, A3 104c, and A4 104d may, for instance, be compatible with the physical characteristics of telephones A1 102a, A2 102b, and A3 102c produced by a single manufacturer A. Pockets B1 104e, B2 104f, B3 104g and B4 104h may be physically compatible with telephones B1 102d, B2 102e, B3 102f and B4 102g produced by manufacturer B, or alternatively produced by manufacturer A, but having different physical characteristics from telephone 102a, 102b and 102c. Although in the example the pockets 104a–d are physically compatible with the telephones 102a–c, and the pockets 104e–h are physically compatible with telephones 102d–g, all the various functionalities of telephones 102a–c may not all be supported by the pockets 104a–d and all the various functionalities of the telephones 102d–g may not all be supported by the pockets 104e–h. Similarly, the functional or other capabilities of the pockets 104a–h may not all be supported by all of the telephones 102a–g. In FIG. 6, the functional compatibilities between the individual pockets 104a–h and the individual telephones 102a–g are illustrated by arrows. A solid arrow from a pocket 104 to a telephone 102 indicates that all of the functions of the particular telephone 102 are supported by the particular pocket 104, while solid arrows from a telephone 102 to a pocket 104 indicate that all of the particular pocket's 104 capabilities are supported by the particular telephone 102. A dotted line from a telephone 102 to a pocket 104 indicates that only a subset of the pocket's 104 capabilities are supported by the particular telephone 102, while a dotted line from a pocket 104 to a telephone 102 indicates that only a subset of the particular telephone's 102 capabilities are supported by the particular pocket 104.

As an example, telephones A1 102a, A2 102b, and A3 102c may share common physical attributes, allowing any of those telephones to be mechanically interconnected to any of the pockets A1 104a, A2 104b, A3 104c, and A4 104d. However, the telephones A1 102a, A2 102b, and A3 102c may have differing functional capabilities. Likewise the pockets A1 104a, A2 104b, A3 104c, and A4 104d may support different functions. For instance, pockets A1 104a, A2 104b, and A3 104c may support all of the functional capabilities of telephones A1 102a and A2 102b, but only a subset of telephone A3's 102c capabilities while pocket A4 104d may support all of the functional capabilities of telephones A1 102a, A2 102b and A3 102c. Telephones A1 102a and A2 102b may support all of the functional capabilities of pockets A1 104a, A2 104b, and A3 104c, but only a subset of the functional capabilities of pocket A4 104d, while telephone A3 102c may support all of the functional capabilities of pockets A1 104a, A2 104b, A3 104c and A4 104d. Examples of the interaction between pockets 104 having differing functional capabilities and telephones 102 having differing functional capabilities will now be explained in the context of various examples.

The pocket A1 104a may be a level one pocket supporting only the most basic functions provided by the system 100. Thus, the pocket A1 104a may provide basic speaker phone functions when interconnecting telephones A1 102a, A2 102b or A3 102c to the interface module 106. The basic speaker phone functions may comprise the provision of a speaker 366 and microphone 368, to allow the user to carry on a conversation transmitted over a wireless link by the telephone 102 without having to hold the telephone 102 to his or her face. Thus, with reference now to FIG. 3, the pocket A1 104a may provide analog audio signal lines 304 and 306 to support analog audio signals from and to the telephone 102, where the telephone, e.g. telephone A1 102a, provides an analog audio input and output. The pocket A1 104a may also provide analog audio amplifiers 318 and 502 (see FIG. 5) to allow for the gain of the analog audio signals to be adjusted. The pocket A1 104a then provides connections for the analog audio signals to the interface module 106. Where the telephone A1 102 provides a digital input or output, for example, telephone A2 102b, the pocket A1's 104a digital audio signal lines 308 pass the digital audio signal directly to the interface module 106. In general, the capabilities and specifications of the telephone 102 are communicated to the interface module 106 by the pocket 104 via the pocket-IM communications bus when the pocket 104 is initially interconnected to the interface module 106.

The pocket A1 104a also may provide a power line 303 for charging the battery 107 of the telephone 102 and/or providing electrical power to operate the telephone 102. The pocket A1 104a additionally includes telephone control signal lines 314 between the telephone 102 and the microprocessor 320. Finally, the pocket A1 104a may provide a radio frequency signal line 316, where a radio frequency output connector 118 is provided by the telephone 102.

According to the embodiment of the system 100 having a level one pocket A1 104a, the telephone 102 is physically held in position in the automobile 302, and is provided with speaker phone functionality. Thus, where a telephone call is placed from a remote site to the telephone 102, the user must generally press a button on the keypad 112 of the telephone 102 to enable communications with the telephone at the remote site. The establishment of the communications link with the remote site is signaled to the pocket 104 by the telephone 102 over the telephone control signal lines 314. The form of the signal given by the telephone 102 is generally proprietary to the manufacturer of the telephone 102. Accordingly, it may consist of a serial digital message, or simply by a change in the voltage at an electrical contact on the telephone 102. The pocket 104, and in particular the microprocessor 320, is programmed to recognize the particular message sent from the telephone 102 to indicate that a call is in progress. The microprocessor 320 then converts the message from the telephone 102 into one complying with the application programming interface (API) of the system 100. This message may be transmitted from a serial I/O port provided on the microprocessor 320 over the pocket-IM communication bus 322 to the far-end UART 338 and from there to a parallel input/output port provided on the interface module microprocessor 328 of the interface module 106. The interface module microprocessor 328 reviews the call-in-progress message that originated in the telephone 102 and that was translated into the API of the system 100, and generally configures the system 100 so that it is ready to handle the call. In particular, the interface module microprocessor 328 activates the mute signal line 362 to mute any output from the automobile's 302 audio system 373. When the telephone provides an analog audio input 306 and an analog audio output 304, the interface module microprocessor 328 may also activate the analog audio output amplifier 318. Thus, where the telephone 102 provides an analog audio signal, that signal may be amplified by the analog audio amplifier 318 and passed to the interface module 106 wherein the analog signal is digitized by the far-end CODEC 336. The now digital audio signal is then passed to the multiplexer 342 and on to the interface module microprocessor 328 at a serial I/O port. The interface module microprocessor 328 then may perform a variety of signal processing functions on the audio signal. These functions may include acoustic echo cancellation, line echo cancellation, noise reduction, and frequency equalization. The digital signal processor may also provide partial full duplex operation, and automatic volume control functions. The processed digital audio signal is then passed from a serial I/O port of the interface module microprocessor 328 to the near-end CODEC 334 where the digital audio signal is converted back into an analog signal. The analog signal may then be amplified to line level and conditioned in the analog audio amplifier 344 before being amplified by the audio system 373 or by a power amplifier associated with the speaker 366 and output by the speaker 366.

Voice signals from the user in the automobile 302 are picked up at the microphone 368, which may feature built-in noise reduction capabilities, and digitized by the near-end CODEC 344, before being passed to the serial I/O port of the interface module microprocessor 328. Again, various signal processing functions may be carried out in the interface module microprocessor 328, before the digital audio signal is passed to the multiplexer 342 and on to the far-end CODEC 336. The far-end CODEC 336 transforms the digital audio signal into an analog signal that is passed to the telephone 102 for transmission over the air link to the remote site.

Where the telephone 102 provides digital audio inputs and outputs, for example, telephones A2 102b and A3 102c, the transmission of signals through the system 100 is generally as described above, except that the digital audio signals are passed between the telephone 102 and the interface module microprocessor 328 via the multiplexer 342, without any intervening amplification, and without passing through the far end CODEC 336.

The level one pocket A1 104a may also provide the telephone 102 with power for charging the battery 107 and operating the telephone 102 over power line 303. In general, the microprocessor 320 of the pocket 104 will have been programmed to request the proper voltage or current from the programmable power supply 330 of the interface module 106. Of course, the power needs of the telephone 102 may vary according to the operational state of the telephone 102 or the charge of the battery 107. Therefore, the telephone 102 may request, for example, that power be supplied at a first voltage when the telephone 102 is in an idle state, and at a second voltage when the telephone 102 is in an active state. The signal requesting differing voltages may be passed from the telephone 102 over the telephone control signal lines 314 to the microprocessor 320 where the request is translated to the API of the system 100. The interface module microprocessor 328 may then control the programmable power supply 330 to provide the requested power. The pocket may also include a current limiter or voltage regulator as required.

Because the pocket 104 is designed to provide a predetermined set of functionalities and to be used with a predetermined telephone or set of telephones 102, the microprocessor 320 and in particular the memory 324 associated with the microprocessor 320 will have been programmed to translate the particular signals of the telephone 102 into commands included in the API of the system 100. In addition, the pocket 104 will have been programmed with the power requirements of the telephone 102. This information regarding the functions supported and requirements of the telephone 102 may be communicated over the pocket-IM communications bus 322 to the interface module microprocessor 328 when the pocket 104 is plugged into the interface module 106. The pocket 104 also communicates information regarding the functions supported by the pocket 104 to the interface module 106. In general, the interface module 106 is activated when the pocket 104 is plugged into the interface module 106 and the pocket sense ground 326 is established between the pocket 104 and the interface module 106.

A second pocket 104b, known as a level two pocket, may provide additional functionalities. For example, the pocket 104b may support audible prompts, voice commands and voice memorandum recording. As illustrated in FIG. 6, the functionalities of pocket A2 104b are fully supported by telephones A1 102a, A2 102b and A3 102c, even though it provides this additional functionality. Also, the interface module 106 may be identical to the one described with reference to pocket A1 104a. With respect to the basic speaker phone functions provided by the system 100 in connection with pocket A2 104b, the functions and interconnections are as described above with respect to the pocket A1 104a.

In order to support voice commands, the pocket A2 104b must be programmed to convey appropriate messages between the telephone 102b and the interface module 106. For instance, the pocket A2 104b must be capable of providing the telephone 102 with a telephone control signal directing the telephone 102 to pick up an incoming call. This is in contrast to the example given above with respect to pocket A1 104b in which the user must press a button on the keypad 112 of the telephone 102 to pick up an incoming call. In addition, the microprocessor 320 of the pocket 104b must include API commands for functions such as answering an incoming call. Apart from enabling additional functionalities such as voice recognition and voice memorandum recording, the pocket A2 104b is, according to one embodiment of the present invention, the same as pocket A1 104a.

Audible voice prompts are, according to an embodiment of the system 100 of the present invention, provided to guide a user operating the system 100. Audible prompts are particularly advantageous when used in connection with voice recognition functions because they facilitate operation of the system 100 without requiring that the user look at the system 100 itself. For example, the system 100 may acknowledge commands given by the user, or provide the user with information concerning the status of the system 100. The audible prompts may be pre-recorded and stored in the pocket memory 324 and/or the IM memory 340, with or without compression. Alternatively or in addition, the audible prompts may be generated from text stored in memory 324 or 340 using a text to speech functionality (described below). According to one embodiment, the voice prompts are stored in easily changed memory 324 or 340 cartridges, to allow the existing system 100 to be upgraded, or to accommodate a different or an additional language.

The interface module 106 may include speech recognition functions to enable the system 100 to recognize voice commands. The interface module used in connection with pocket A2 104b may be identical to the interface module 106 used in connection with pocket A1 104a. Alternately, the interface module 106 used in connection with pocket A2 104b may be enhanced to provide voice recognition functions. Even if the interface module 106 is provided in various models offering differing capabilities, any interface module 106 is preferably compatible, at least in part, with any pocket 104. In general, speech models are stored in the IM memory 340 or the pocket memory 324 to enable the system 100 to recognize universal commands such as "answer call" or "place call." Different memory 324 or 340 cartridges may be provided to conveniently upgrade the speech models or change them to a different language. In addition, provision may be made in the interface module 106 for storing user defined commands, such as "call home" or "call Mary." According to one embodiment of the present invention, the user defined commands and voice memoranda may be stored in removable memory 324 or 340 to facilitate their use in other systems 100 or in compatible devices, to archive memoranda, or to allow the use of different command sets. The removable memory 324 or 340 may comprise a RAM memory card. The pocket A2 104b may be provided with buttons 142 (see FIG. 1B) to enable the user to signal the system 100 to enter a voice command mode or voice memo record mode.

The operation of the system 100 in processing a voice command will now be explained in the context of an example. Where a telephone call is not in progress (i.e. the telephone 102 is on-hook), a user may command that a general voice recognition mode be entered by uttering a special initiator word (e.g., "CellPort"). The system 100 may also be provided with a "barge-in" capability to allow voice recognition mode to be entered even while a telephone call is in progress (i.e. the telephone 102 is off-hook). Alternatively, the user may press a button 142a provided on the exterior of the pocket 104b to place the system 100 in voice recognition mode. Upon receiving the signal to enter voice recognition mode, the processor 320 sends a message across the pocket-IM communication bus 322 to the interface module microprocessor 328 via the UART 338. The message sent by the microprocessor 320 is formatted according to the API of the system 100. Upon receiving the message to enter voice recognition mode, the interface module microprocessor 328 activates or otherwise communicates with the microphone 368. When a voice command is used, the interface module microprocessor 328 will cause the system 100 to enter a general voice recognition mode after a prescribed voice command has been issued by the user Voice commands issued by the user are converted into analog electrical signals by the microphone 368 and passed through the near-end CODEC 334, where the analog signals are digitized. The digitized voice commands are then compared in the interface module microprocessor 328 to the standard and customized speech models stored in the flash memory 340. If, for example, the user issues the command "call home," the interface module microprocessor 328 will attempt to match those words to the stored word models. Upon finding a match, the interface module microprocessor 328 will initiate action according to the command. Thus, when the command "call home" is received, a signal to initiate a telephone call will be formatted in the API of the system 100, and passed to the microprocessor 320 of the pocket A2 104b, where the API command is translated into a signal understood by the telephone 102. Where the telephone number associated with "home" is stored in memory 324 or 340, the command to the telephone 102 may consist of the digits of the telephone number and the send command. Alternatively, where the telephone 102 allows access to telephone directories stored in its internal memory, the command from the interface module microprocessor 328 may be in the form of a command to retrieve a number from a specified memory location in the telephone 102 and to initiate the send function.

The functions provided by the level two pocket A2 104b may also include provisions for voice memo recording. Thus, by pressing the associated buttons 142b, or by issuing the appropriate voice command, such as "take a memo", the system 100 may be configured to record a voice message. Such a capability is useful, for instance where a user wishes to give him or herself a reminder to do something without having to write the reminder down with pencil and paper. The voice memorandum capability is also useful for recording directions or a telephone number given by the person at the other end of the communications link. In voice memo recording mode, the voice message is converted to an analog electrical signal by the microphone 368 and transmitted to the near-end CODEC 334 where the signal is digitized. The digital voice memo is then processed and compressed by the interface module microprocessor 328 and stored in memory 340. When the user wishes to retrieve the voice memo, the user may press a button 142c on the pocket A2 104b causing a command to be sent from the microprocessor 320 across the pocket-IM communication bus 322 to the interface module microprocessor 328, in the API of the system. The interface module microprocessor 328 then retrieves the message from memory 340, decompresses the message, performs signal processing functions, and provides a digital output of the message to the near-end CODEC 334, which converts the memo to an analog signal that is then amplified by the amplifier 344 and output at the speaker or headset 366. Where the command to replay a previously recorded voice memo is in the form of a voice command, the recognition of the voice command by the interface module microprocessor 328 initiates the retrieval of the voice message from memory 340 for playback through the speaker 366. In addition or as an alternative to playback through the speaker 366, the memorandum may be transmitted to another device for playback. For example, the memorandum could be transmitted by the telephone 102 to a remote telephone or device, or it could be transmitted to a computer or other external subsystem 378 for playback.

A next level of functionality may be provided by the system 100 in connection with a pocket A3 104c. The additional functions provided by the pocket 104c may include storage for voice memos, directories and customized voice commands in the pocket 104. As illustrated in FIG. 6, the functionalities of pocket A3 104c are fully supported by telephones A1 102a, A2 102b and A3 102c. The interface module 106 may be identical to the interface module used in connection with any of the pockets A1–A4 104a–c and B1–B4 104e–h. The functionalities pocket A3 104c shares with pockets A1 104a and A2 104b may be executed in the same manner as described above.

The pocket A3 104c is provided with memory 324 sufficient to allow the recordation of voice memos and for the storage of voice commands and directories programmed by the user in the pocket A2 104c. In addition, a UART may be provided in the pocket A3 104c to synchronize the transfer of voice memos and voice command data between the interface module 106 and the pocket 104. In general, the voice memo recording function using the pocket A3 104c is identical to the function when carried out by pocket A2 104b. However, the provision of additional memory 324 in the pocket A3 104c allows for voice memos to be stored in the pocket A3 104c. According to one embodiment of the present invention, voice memoranda may be stored in the pocket memory 324 as each memorandum is recorded. Alternatively, voice memoranda may be stored initially in the interface module memory 340, and later transferred to the pocket memory 324 automatically when the system 100 has the resources available to complete such a transfer. As yet another alternative, the user may initiate a transfer of voice memoranda data to the memory 324 in the pocket A3 104c by, for example, pressing a button provided on the pocket A3 104c or by issuing an appropriate voice command. Control logic provided in the pocket microprocessor 320 and/or the interface module microprocessor 328 may be provided to control whether data already written to the memory 324 is overwritten by new data. For example, the user may be notified when the memory 324 is full, and given a choice as to whether old data should be overwritten. After the voice memoranda has been transferred to the pocket memory 324, the pocket A3 104c, which is easily disconnected from the interface module 106, can then be taken to, for example, the user's office. The pocket A3 104c may then be interconnected to a device in the office having a microprocessor and associated speaker, similar to the interface module 106, for playback of stored messages. The UART 402 in the pocket A3 104c allows the memo data to be transmitted over a dedicated line for storage in the pocket A3 104c.

The ability to store customized directories and voice commands in the pocket A3 104c allows a user to use those customized features in any car equipped with a suitable interface module 106. Therefore, by moving the telephone 102 and the pocket A3 104c different users may share an automobile, while retaining access to their own directories and commands. This feature is also useful where a user rents an automobile provided with an interface module 106, as all of the user's personalized information can be carried in the pocket A3 104c.

A further level of functionality may be provided by the system 100 in connection with pocket A4 104d. As illustrated in FIG. 6, the functionalities of pocket A4 104d are fully supported by telephone A3 102c, but only partially supported by telephone A1 102a and telephone A2 102b. Pocket A4 104d fully supports the functionalities of telephones A1–A3, 102a–c. The additional functionalities provided or enabled by pocket A4 104d may include text to speech capability. The text to speech function allows the system 100 to convert information received in the form of written text to audible speech. However, the text to speech function generally requires a telephone 102 capable of receiving textual information. According to the example illustrated in FIG. 6, telephone A3 102c is the only telephone from manufacturer A having e-mail or Internet browsing capabilities. In the example of FIG. 6, telephones A1 102a and A2 102b lack the capability to receive information in the form of text and therefore cannot fully support the text to speech function. However, it should be noted that some text to speech capability may be possible in connection with telephones A1 102a and A2 102b, for example where information in the display 114 of the telephone 102a or 102b, such as caller ID information, is provided at the electrical connector 116 of the telephone 102a or 102b, in which case the information can be presented to the user as audible speech. In addition, the text to speech function may service other subsystems 378 capable of providing textual output. Generally, the pocket 104d provides all of the functions described above with respect to pockets A1–A3, 104a–c.

The pocket A4 104d is provided with commands in the microprocessor 320 to support the receipt of textual information from the telephone 102c. The information received by the telephone 102c is formatted into the API of the system 100 by the microprocessor 320 and transmitted to the interface module 106 over the digital data signal line 308 or the pocket-IM communication bus 322. According to one embodiment of the present invention, the interface module 106 for use in connection with the pocket A4 104d includes an additional processor at the custom interface 348, which may be conveniently mounted on a daughter board 380, for performing the text to speech function. Generally, the processor at the custom interface 348 transforms the received text into digitized speech, which can then be passed to the interface module microprocessor 328, and from there to the near-end CODEC 334 for conversion to an analog audio signal. The analog audio signal is then output through the speakers 366. The use of an additional processor at the custom interface 348, which can be added to the normal interface module 106, is desirable in that it allows for the use of a specialized processor for handling the relatively complex text to speech translation function. Additionally, it allows interface modules 106 not intended for use with a text to speech enabled pocket 104 and telephone 102 to be produced at a lower cost. As alternatives, the interface module microprocessor 328 may be sufficiently powerful or robust to perform the text to speech function, or an enhanced interface module 107, having a text to speech enabled interface module microprocessor 328 may be offered in addition to the normal interface module 106. As a further alternative, an enhanced microprocessor 320 in the pocket, or an additional microprocessor, may be provided in the pocket A3 102c to handle the text to speech function. Apart from enabling additional and/or different functionalities, such as text to speech, the pocket A3 104c is generally the same as pocket A1 104a and A2 102b.

In connection with the above description of pockets A1–A4 104a–d and their functional capabilities, a user may generally choose the capabilities of the system 100 according to the user's needs and desires by choosing the appropriate pocket A1–A4 104a–d. Thus, a user owning any of telephones A1–A3 102a–c can choose a system 100 having basic hands-free capabilities by purchasing pocket A1 104a and interface module 106. By purchasing pocket A2 104b and an interface module 106, a user may obtain voice command and voice recording capabilities. The use of pocket A3 104c in connection with an interface module 106 provides the user with a system 100 that allows voice memos and programmed voice command information to be stored in the easily transported pocket A3 104c. Accordingly, it is the pocket A1 104a, A2 104b, or A3 104c that determines what capabilities the system 100 provides when used in connection with either a telephone A1 or A2 102a or 102b. Also, when purchasing a new pocket 104 in order to obtain advanced features or to accommodate a different telephone 102, the user need not replace the interface module 106. Furthermore, the same interface module 106 may be used in connection with pockets A1–A3 104a–c.

A system 100 providing text to speech capabilities may be obtained by using an interface module 106 with an additional or an enhanced processor or an enhanced interface module 107, pocket A4 104d, and telephone A3 102c. Although the interface module 106 or 107 used in connection with pocket A4 104d in this example provides enhanced capabilities, it should be noted that, except for the text to speech function, pocket A4 104d is fully supported and fully compatible with the general interface module 106. Similarly, pocket A4 104d can be used with telephones A1 or A2 102a or 102b.

With continued reference to FIG. 6, the relationship between telephones B1–B4 102d–g, pockets B1–B-4 104e–h, and interface module 106 are illustrated. In general, pockets B1–B4 104e–h provide the four levels of functionality described above with respect to pockets A1–A4 104a–d, but are designed to physically and electrically interconnect with telephones B1–B4 102d–g produced by manufacturer B. However, the pockets B1–B-4 104e–h are designed to work with the same interface module 106 as pockets A1–A4 104a–d.

As shown in FIG. 6, pockets B1 and B2 104e and 104f are fully compatible with telephones B1 and B2 102d and 102e, but only partially compatible with telephones B3 and B4

102*f* and 102*g*. Additionally, pockets B3 and B4 104*g* and 104*h* fully support the functional capabilities of telephones B3 and B4 102*f* and 102*g*, but are only partially compatible with telephones B1 and B2 102*d* and 102*e*. This situation may occur, for instance, where telephones B1 and B2 102*d* and 102*e* feature an older interface used by manufacturer B, while telephones B3 and B4 102*f* and 102*g* use a newer interface. Therefore, even though the telephones B1–B4 102*d–g* may have the same physical characteristics, changes to the interface used to control and send data to and from the telephones 102*d–g* will affect their compatibility with the pockets 104*e–h*. According to an embodiment of the system 100, where a user has upgraded their telephone 102, but wishes to use a pocket having an interface adapted for an earlier model of the telephone 102, provided that the telephone 102 and pocket 104 are still physically compatible, the pocket 104 can be upgraded by modifying the memory 324 of the pocket 104 to enable the pocket 104 to properly interact with the telephone 102.

Modifications to the memory 324 may be made by transmitting the upgrade to the memory 324 through a physical connection to a component of the system 100. For example, the pocket 104 may be connected to a personal computer that has been used to download a programming upgrade from an Internet website, or to read new programming code distributed on a floppy disk, CD ROM, or other storage medium. Alternatively, the interface module 106 could be connected to a personal computer, and new programming code loaded onto the memory 340 of the interface module 106. Regardless of whether the pocket 104 or the interface module 106 is used to initially receive the updated programming code, the programming code resident in the pocket memory 324, the interface module memory 340 or both can be modified using the above-described methods. Where a telephone 102 capable of downloading information from the Internet is available, that telephone 102 may be used to download new programming code to upgrade the pocket 104 and/or the interface module 106. Another method of upgrading the programming code of the system 100 is for the user to purchase an upgraded pocket 104 that contains new programming code for upgrading the code stored in the interface module memory 340. Similarly, an interface module 106 containing the necessary code may be used to upgrade the code resident in the pocket memory 324. As yet another method of upgrading the code resident in the memory 324 or 340, all or portions of the memory 324 or 340 may be augmented or replaced by memory 324 or 340 having upgraded programming code.

However, modifying the memory 324 to properly translate between a new telephone interface and the API of the system 100 will not be sufficient where the manufacturer has made changes to the physical configuration of the telephone 102. Also, changes to the memory 324 alone will not be sufficient where the user has, for instance, purchased a new telephone from a different manufacturer having a different physical configuration. In these instances, compatibility with the system 100 may be regained by purchasing a new pocket 104 that is compatible with the user's new telephone 102. The purchase cost of a pocket 104 is preferably much less than the purchase cost of both a pocket 104 and an interface module 106, as the interface module 106 originally purchased by the user may be used with the new pocket 104.

The multiple-processor multiple-bus configuration of the system 100 allows the system 100 to be designed using modular units. In particular, the system 100 provides a pocket 104 for at least every combination of physical and electrical characteristics found in supported telephones 102.

The system 100 allows the use of a common interface module 106 by converting the unique physical and electrical characteristics of supported telephones 102 to a common electrical and physical interface at the pocket 104. Therefore, common system components can be placed within the interface module 106, while particular attributes required by particular telephones 102 can be accommodated by the pocket 104. In this way, the cost of the system 100 can be reduced and the flexibility increased.

The application programming interface (API) of the system 100 is the common language used to communicate commands and information between the pocket 104 and the interface module 106. Translation between the interface of the telephone 102 and the API of the system 100 is performed in the pocket 104, and in particular in the microprocessor 320. After translation in the microprocessor 320, commands and information originating at the telephone 102 can be transmitted using the API to the interface module 106 over the pocket-IM communication bus 322. Commands and data originating at the interface module 106 and at the system 100 follow the reverse course, with commands and data formatted in the API of the system 100 being translated into the telephone's 102 unique interface at the microprocessor 320 of the pocket 104.

Where the system 100 is to be interconnected with subsystems 378 in addition to the telephone 102, an additional processor or custom interface 348 may be provided to perform translation between the API of the system 100 and the interface of the subsystem 378 to which the system 100 is interconnected. Preferably, the custom interface 348 may be provided in the form of an add-on or daughter board 380 that can be interconnected to the interface module microprocessor 328 using provided electrical contacts. Thus, connectivity to various other subsystems 378 may be achieved without requiring changes to the interface module's 106 main components or to the pocket 104 presently in use. Alternatively, the subsystem 378 can communicate using the API of the system 100, without requiring any translation. For example, the interface required to communicate with an external subsystem 378 may be resident in the interface module 106. The custom interface 348 and daughter board 380 may simply provide a mechanical connection, or may not be provided at all where the external subsystem 378 interface is resident in the interface module 106.

As mentioned above, the external subsystem 378 may comprise a variety of electronic devices. The subsystem 378 may include protocol based units and close-ended devices. The protocol based units can include networks and busses having associated components or peripheral devices that are interconnected. The close-ended devices are referred to herein as devices that do not have International Standards Organization (ISO) network layering and typically constitute a terminating communication node in the context of data flow ending or originating from such device, and not typically acting as a link or pass-through device for information or data transfers. An example of such a close-ended device might be a global positioning system (GPS) that is useful in providing vehicle location information, or a hardware device, such as a vehicle sensor, from which data can be obtained for a particular vehicle component to which the sensor is operably connected.

In addition to the GPS, the external subsystem 378 may include an Internet Protocol (IP) stack comprised of a number of network layers that are commonly involved in transfers using the Internet. The external subsystem 378 can also include an intelligent transportation system data bus (IDB) and/or an on-board diagnostics (OBD) system that are involved with monitoring and providing information related to vehicle components.

The external subsystem 378 may also include a controller area network (CAN) found in at least some vehicles and which includes a bus along which a number of vehicle elements communicate for supplying information concerning such elements. The CAN is operatively connected to each of a plurality of vehicle devices that transmit, receive, or both transmit and receive desired data. For example, the vehicle devices include transducers or other physical devices that detect and provide information useful to applications software for processing to obtain information that is then transmitted for storing in memory for later transmission, or even for immediate transmission without processing, upon receipt of the proper request or command. Other available networks could be utilized, instead of CAN, such as Arcnet, which has a protocol similar to CAN. Where the external subsystem 378 includes one of a plurality of vehicle busses, the hardware supplied for interconnecting the external subsystem to the interface module 106, such as the daughter board 380, may include provisions for signaling to the interface module microprocessor 328 the format of the output required by the particular external subsystem 378. For example, the daughter board 380 may comprise cabling, and the presence or absence of a resistor between two signal paths may be used to indicate to the microprocessor 328 the proper voltage at which signals are to be transferred to and from the external subsystem 378. For further information regarding obtaining information or data from vehicle devices, see U.S. Pat. No. 5,732,074, filed on Jan. 16, 1996 and assigned to the assignee of the present invention. The external subsystem 378 may also comprise an analog/digital converter (ADC), a standard serial bus, a universal serial bus (USB), an RS232 connection, a user datagram packet/ Internet protocol stack, as well as one or more other custom proprietary devices.

Other devices that may comprise the external subsystem 378 may include a PCMCIA (Personal Computer Memory Card Interface Association) unit, which may include a storage device for storing desired information or data. The external subsystem 378 may also include a device capable of communication using the Bluetooth protocol, which provides a standard protocol for the wireless communication of information between disparate devices.

Figure 7:
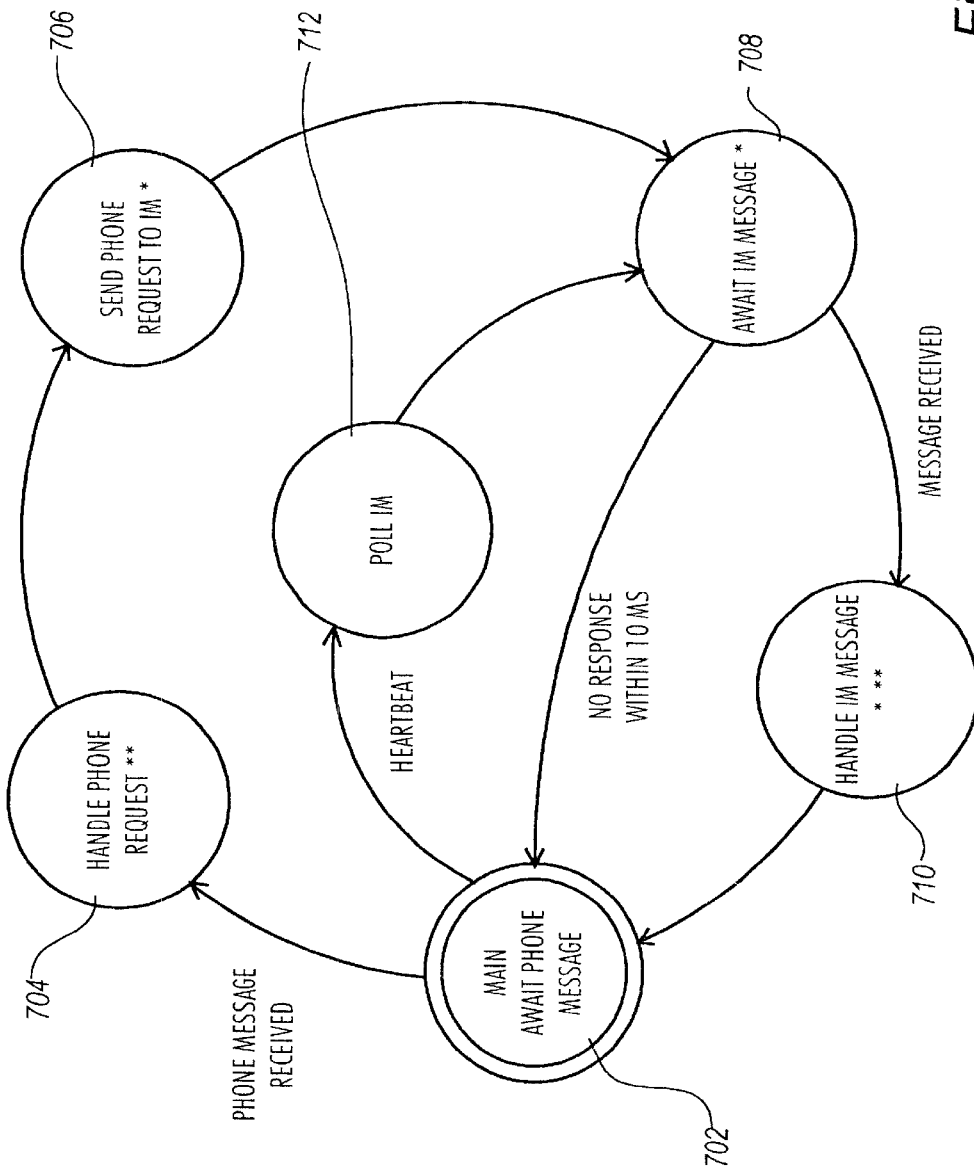
FIG. 7 illustrates the pocket communications state machine according to an embodiment of the present invention.

With reference now to FIG. 7, the pocket communications state machine is illustrated. Generally, in the system 100, the pocket 104 and the interface module 106 are in a master and slave relationship. As shown in FIG. 7, at state 702, the pocket 104, and in particular the microprocessor 320, awaits a message from the telephone 102. Upon receiving a telephone message, the pocket 104 enters state 704 in which the telephone request is handled. After handling the telephone request, the pocket 104 then enters state 706 in which the telephone request is sent to the interface module 106. Next, the pocket 104 awaits a message from the interface module 106 in state 708. If no message is received from the interface module 106, the pocket 104 then returns to state 702. A system 100 also includes the timer that operates in cooperation with determining whether or not a message is received. During normal operation, when no response is received from the interface module 106, another pulse or heartbeat is sent at predetermined times. However, if there is no response within a time interval associated with the timer timing out, a hardware reset line is enabled to reset the interface module 106. Where an interface module 106 message is received, the pocket handles the message in state 710, following which it returns to state 702. Where no telephone message is received, the pocket 104 periodically polls the interface module 106 at state 712. According to an embodiment of the present invention, the pocket 104 polls the interface module 106 every 72 milliseconds (i.e., the pocket 104 heartbeat rate is 72 milliseconds). After polling the interface module 106 in state 712, the pocket 104 enters state 708 in which it awaits a message from the interface module 106. If no message from the interface module 106 is received within 10 milliseconds of polling the interface module 106, the pocket 104 returns to state 702, in which it awaits a telephone 102 message. According to one embodiment of the present invention, communications between the pocket 104 and the interface module 106 occur at 19,200 baud, using eight data bits, one parity bit, and no stop bit. However, other communication rates can be used, and may even be varied.

Figure 8:
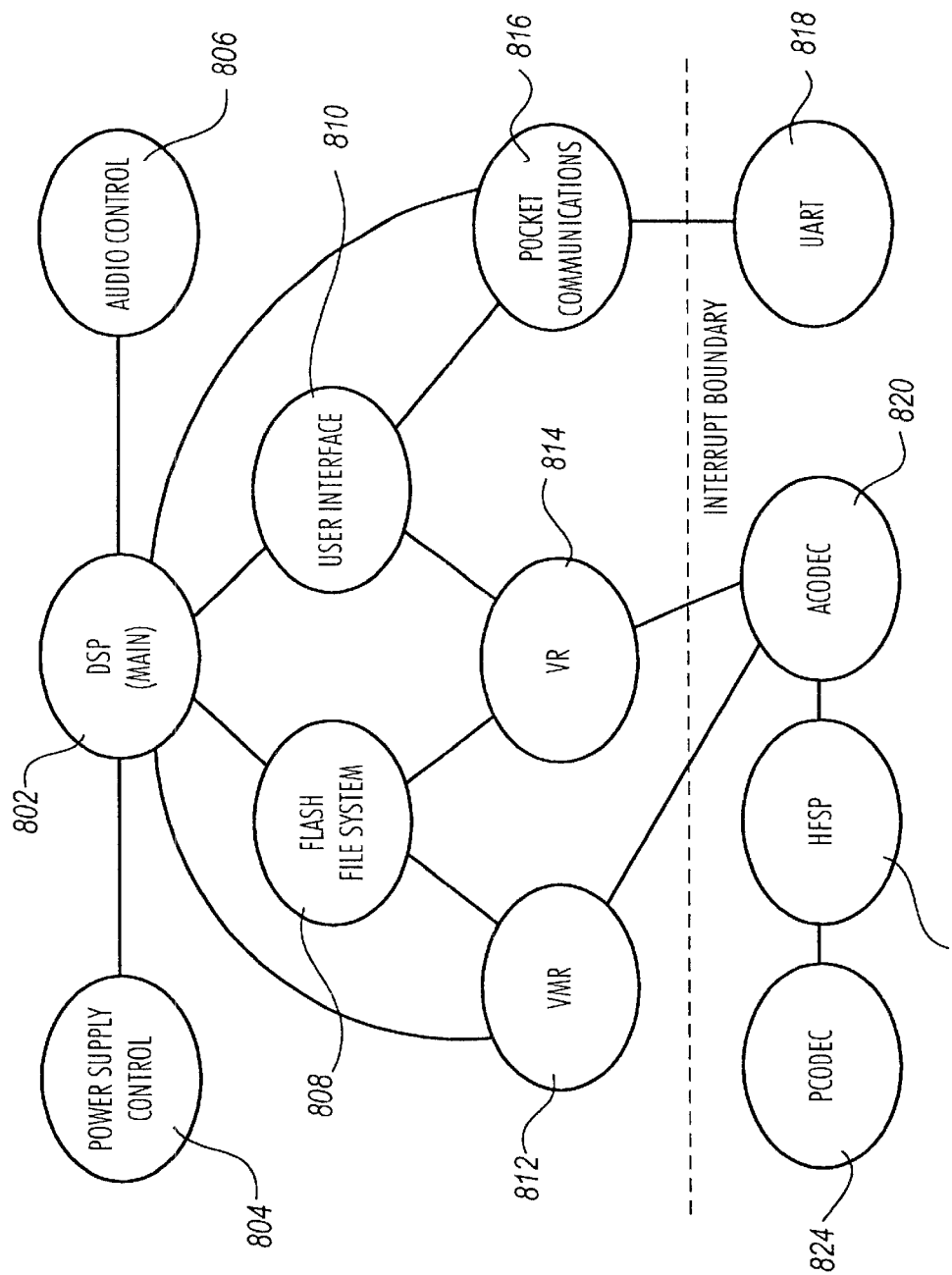
FIG. 8 illustrates the architecture of the interface module software according to an embodiment of the present invention.

Referring now to FIG. 8, the architecture of the interface module 106 software showing the relationships among the various software objects, is illustrated. In general, the top level loop is the digital signal processor object 802. Thus, the power supply control 804, audio control 806, flash file system 808, user interface 810, voice memo recording 812, voice recognition 814, and pocket communications 816 objects can all be entered from the main loop 802 directly. Other software objects or modules are addressed in response to interrupts. Accordingly, communications between the pocket 104 and the interface module 106 generate an interrupt causing the software to enter the UART object 818. Activity concerning the near-end CODEC 334 is handled at object 820 across the interrupt boundary from the voice memo recording 812 and voice recognition 814 objects. Sound processing 822 and far-end CODEC 824 objects are associated with the near-end CODEC 820 object.

Figure 9:
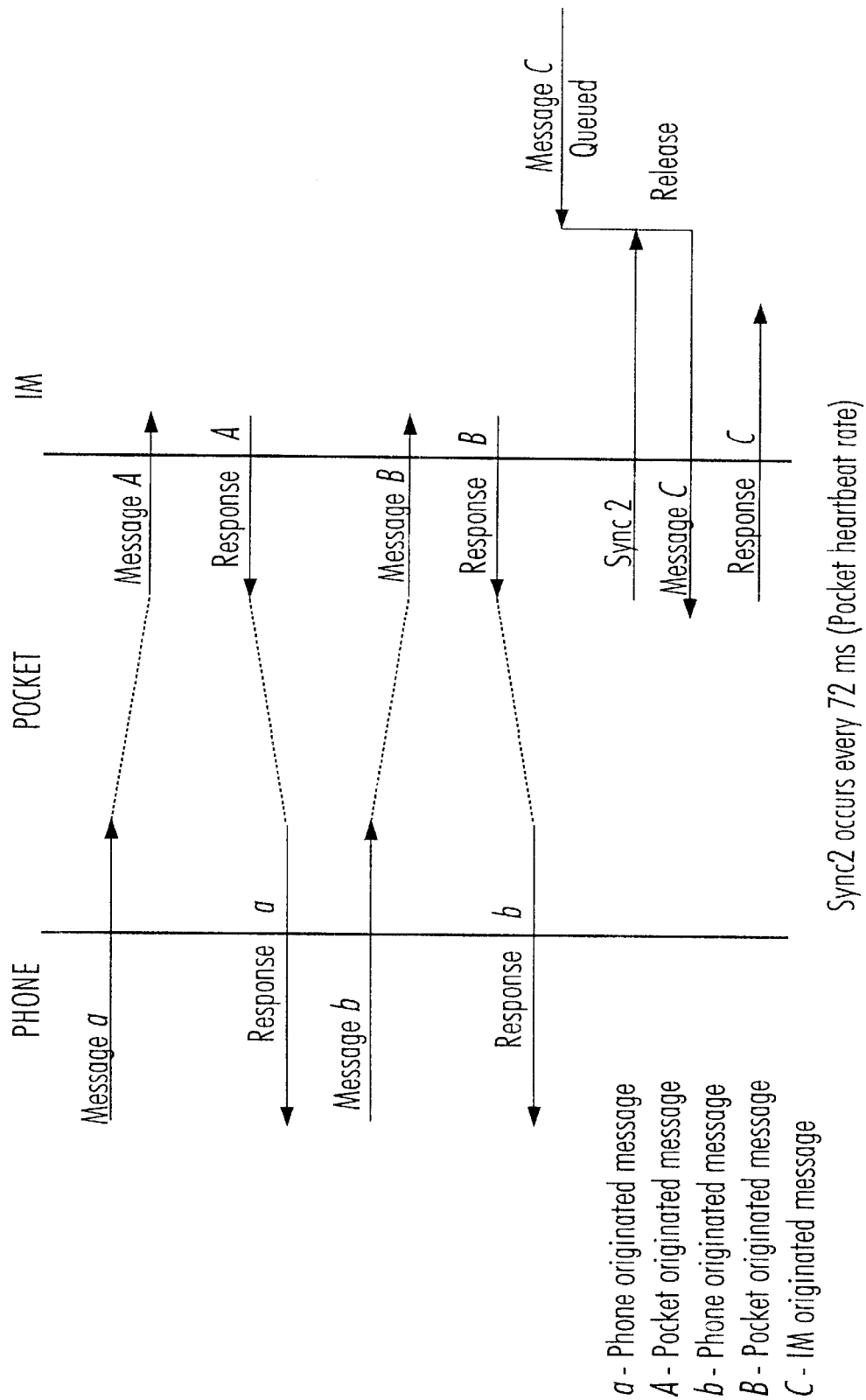
FIG. 9 illustrates a typical communications scenario according to an embodiment of the present invention.

The progression of a typical communication scenario is illustrated in FIG. 9. In FIG. 9, message A is shown originating in the telephone 102 from which it is transmitted through the pocket 104 to the interface module 106. Response A originates in the interface module 106, is transmitted through the pocket 104 and arrives at the telephone 102 as response a. A second message, message b, originates at the telephone 102, is passed through the pocket 104, and arrives at the interface module 106 as message B. Response B originates from the interface module 106, passes through the pocket 104 and arrives at the telephone 102 as response b. Next, message c, which originated in the interface module 106 is shown queued and awaiting attention. At the line labeled "synch 2" message c is released to the pocket 104, the pocket 104 generates response C, and response C is sent to the interface module 106.

Figure 10:
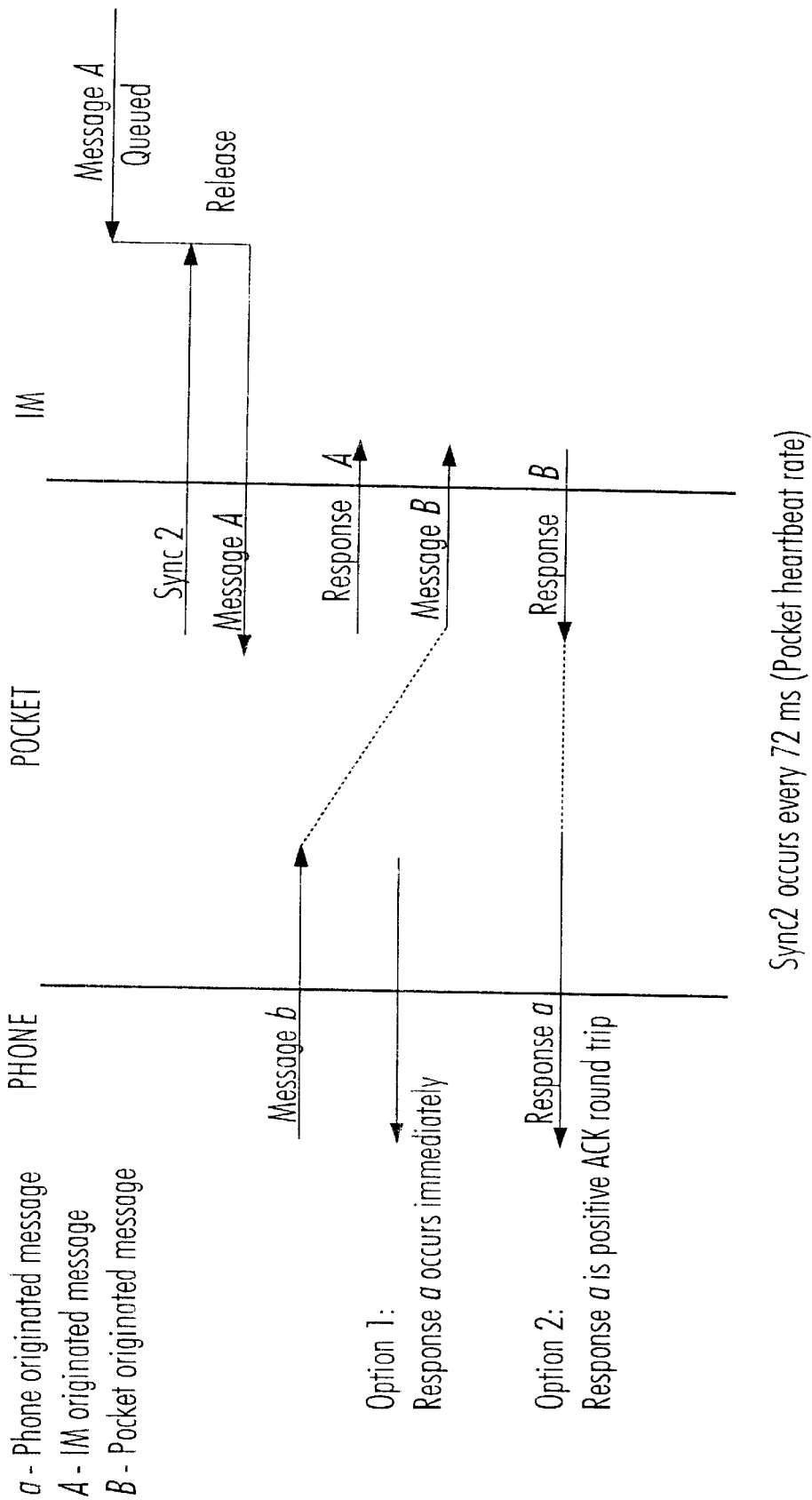
FIG. 10 illustrates a pocket worst case communications scenario.

With reference now to FIG. 10, a pocket 104 worst case scenario is illustrated. In FIG. 10, message A, is shown queued in the interface module 106. Message A is released after synch 2 to the pocket 104. At the time Message A is released, Message b is received from the telephone 102. In response to this situation, the pocket can immediately pass Message A to the telephone and return Response A to the interface module, while delaying handling of Message B from the telephone, or the pocket can communication Message B to the interface module as Message B while delaying the handling of Message A.

Figure 11:
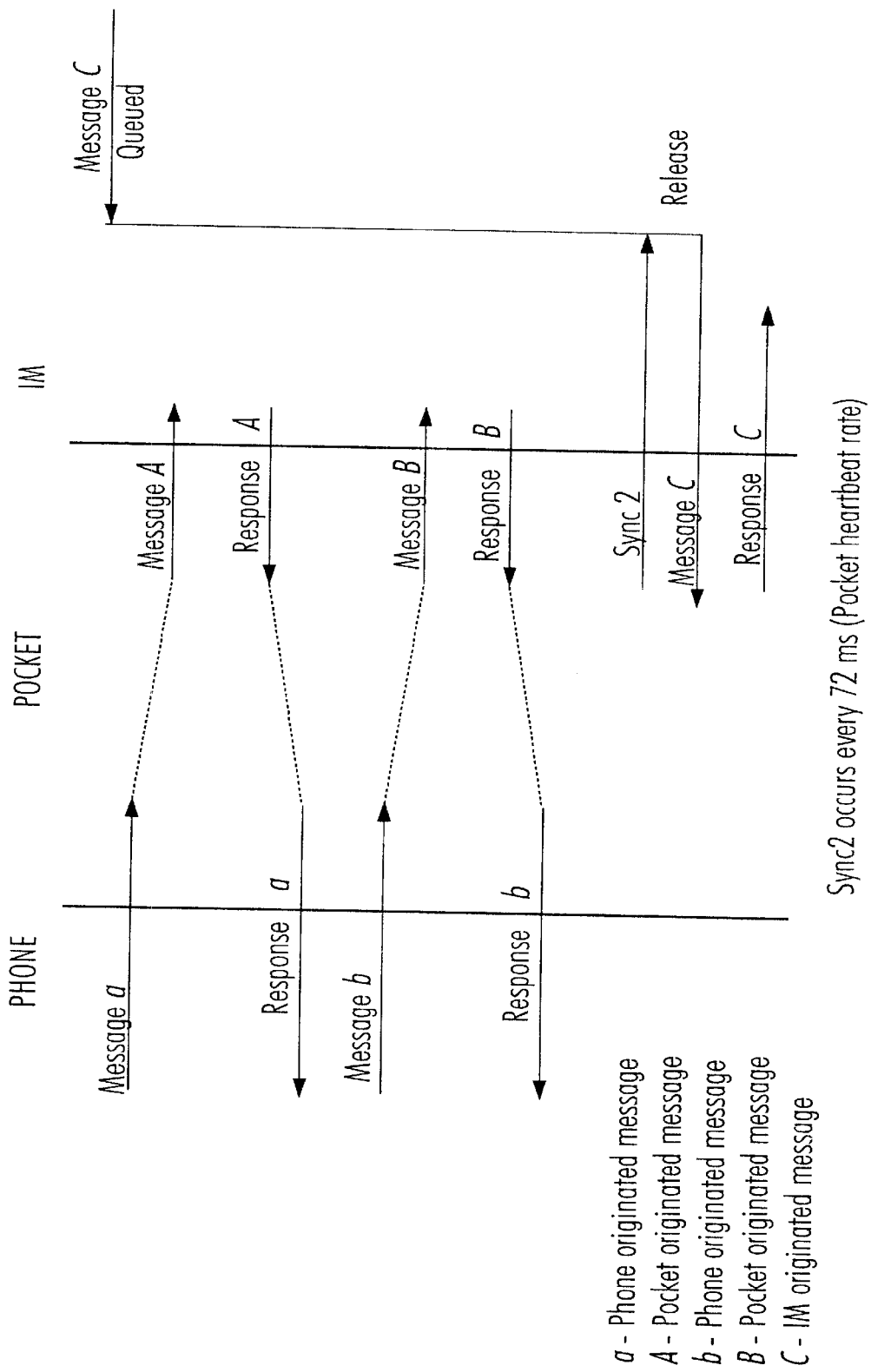
FIG. 11 illustrates an interface module worst case communications scenario.

With reference now to FIG. 11, an interface module 106 worst case scenario is illustrated. In FIG. 11, Message C is shown queued in the interface module 106. Shortly after Message C is queued, Message a is received at the telephone 102 and is communicated through the pocket 104 and to the interface module 106 as Message A. Then while Message C continues to be queued, Response A is communicated to the telephone 102 as Response a. Message B is then received at the telephone 102 and is communicated to the interface module 106 through the pocket 104 as Message B. The interface module 106 then sends Response B through the pocket 104 into the telephone 102 as Response b. Following the receipt of Response b at the telephone 102, a synchronization signal, labeled Synch 2, is sent from the pocket 104 to the interface module 106, causing the release of the queued message. Message C is then delivered to the pocket 104, and Response C delivered from the pocket 104 to the interface module. Therefore, in this worst case scenario, Message C could not be handled until Messages A and B had been dealt with, and the synchronization signal received.

According to one embodiment of the system 100 of the present invention, the interface module 106 is provided with programming instructions necessary for communicating with the telephone 102. According to this embodiment, the pocket 104 need not be provided with a microprocessor 320 or memory 324. Instead, the pocket 104 may simply provide a physical interconnection to the telephone 102, and for the transfer of signals from the telephone 102 directly to the interface module 106. Where the interface module 106 is not intended to interconnect to telephones 102 having a variety of physical characteristics, the pocket 104 need not be a component that is separate and distinct from the interface module 106. According to one embodiment, the interface module 106 may be provided with programming code enabling it to interface with a variety of telephones 102. Thus, the pocket 104 may provide a signal to the interface module 106, for example, by providing differing voltage levels at input pins associated with the interface module 106 microprocessor 328 to indicate the type and capabilities of the telephone 102. The interface module 106 may use this information to select the appropriate command set for communicating with the telephone 102. The interface module 106 may be upgraded to provide advanced capabilities, or to communicate with additional telephones 102 through upgrades to the programming code generally stored in the interface module memory 340. The upgrades may be provided to the interface module 106 by interconnecting the interface module 106 to a personal computer that has read or downloaded the code upgrade, or by downloading the upgrade through an Internet-enabled telephone 102 directly to the interface module 106.

The text to speech functionality described above with respect to certain embodiments of the present invention may be augmented by the ability to visually display textual information. Accordingly, textual information may be displayed, for example, on a screen associated with an external subsystem 378. Thus, textual information may be displayed on the screen of a personal digital assistant (PDA), a personal computer, or a display screen provided by the automobile 302. The system 100, upon receipt of textual information, may in a default mode provide a visual output of text where a visual display is interconnected to the system, and an audible output. The user may also select whether textual information is to be provided audibly or visually. For example, a user may command the system 100 to "read e-mail." Alternatively, the user may command the system 100 to "display e-mail."

The system 100, particularly in connection with an automobile 302, may provide a variety of useful, automated functions. For example, the interface module 106 may be provided with a custom interface 348 that includes a telematics module to monitor activity occurring on an external subsystem 378. For instance, where a first external subsystem 378 is a vehicle bus, a message indicating a low fuel status transmitted over the bus may be decoded by the custom interface 348. The custom interface 348 may then cause a query to be transmitted over the wireless link provided by the telephone 102 to a central station interconnected to the Internet. The query, which may be transmitted from the telephone 102 according to the Internet protocol, may request the location and prices of fuel available in the area. The response to the query may be provided to the user of the system 100 through a visual display provided as, for example, a second external subsystem 378, or may be provided audibly to the user through the text to speech capabilities of the system 100. According to one embodiment, the query includes information concerning the location of the automobile 302. Such information may be provided automatically, for example, from a GPS receiver interconnected to the system 100 as a third external subsystem 378. Alternatively, location information may be provided by a telephone 102 capable of receiving GPS data.

In accordance with the present invention, a method and apparatus for hands-free wireless communications are provided. The invention in its broader aspects relates to an economical method and apparatus for providing various levels of hands-free functionality in combination with wireless communications devices. In particular, the present invention provides a method and apparatus allowing for a wide variety of telephones and pockets to be used with a common interface module.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A system for communicating in a vehicle having a vehicle audio system and being able to use a first communication device and a second communication device having at least physical characteristics different from the first communication device, comprising:

a first holding assembly that can be physically and electrically connected to the first communication device and including a first holding assembly processor;

a second holding assembly that can be physically and electrically connected to the second communication device but not the first communication device and including a second holding assembly processor;

a microphone for receiving voice information;

an interface module that can communicate with each of the first and second communication devices and including at least an interface module processor and an interface module memory, said interface module involved with a number of functions when said first holding assembly is in communication with said interface module and the first communication device is physically and electrically connected to said first holding assembly including:

receiving first voice information;

converting using said interface module processor said first voice information to first digital information compatible with a common communications language used by said interface module;

sending said first digital information in said common communications language to said first holding assembly using at least a first communications bus;

translating said first digital information from said common communications language to a first communications format compatible with the first communication device using said first holding assembly processor to produce a first communication device signal; and providing said first communication device signal to the first communication device using said first holding assembly processor;

wherein when said second holding assembly is joined with the second communication device and second voice information is received, said second voice information is converted to second digital information compatible with said common communications language and, after sending said second digital information to said second holding assembly, said second holding assembly processor translates said second digital information from said common communications language to a second communications format compatible with the second communications device and with said second communications format not being compatible with the first communication device.

2. A system, as claimed in claim 1, wherein:

said number of functions of said interface module includes canceling acoustic echos, line echos and noise from said audio information.

3. A system, as claimed in claim 1, wherein:

said interface module includes a programmable power supply, and wherein said number of functions of said interface module includes providing at least one of a constant current or a constant voltage to said communication device.

4. A system, as claimed in claim 1, further including:

a vehicle bus operatively associated with said interface module, said vehicle bus in communication with a number of peripheral devices in the vehicle for transferring information relative to each of said peripheral devices.

5. A system, as claimed in claim 1, wherein:

said first communications link includes a first communications bus and said holding assembly includes a processor, with said processor of said holding assembly communicating with said interface module processor using at least said first communications bus, said holding assembly processor receiving communications device control signals from said communications device and translating said communications device control signals to be compatible with said interface module.

6. A system, as claimed in claim 1, wherein:

said first communications bus includes at least a first conducting line that carries digital information different from said first and second digital information to said interface module from said first holding assembly independently of said first holding assembly processor.

7. A system, as claimed in claim 1, wherein:

said first holding assembly includes a memory in communication with said first holding assembly processor, said first holding assembly memory storing at least one of said first and second digital information.

8. A method involving communications in a vehicle, comprising:

providing a first communication device for at least temporary use in the vehicle, a first holding assembly for holding said first communication device at least while said first communication device is in the vehicle and an interface module, and with said first communication device, said first holding assembly and said interface module being electrically interconnected, said first holding assembly being configured to operate with a first set of functionalities and said interface module being configured to operate with a main set of functionalities, said first communication device being configured to operate with a second set of functionalities, said main set of functionalities including said first set of functionalities and said second set of functionalities, said first set of functionalities being different from said second set of functionalities wherein one of the following exists: (i) all of said second set of functionalities not being supported by said first set of functionalities and (ii) all of said first set of functionalities not being supported by said second set of functionalities.

9. A method, as claimed in claim 8, wherein:

at least when said first holding assembly is holding said first communication device, said interface module supports functionalities of said second set that are included in said first set while not supporting functionalities of said second set that are not included in said first set.

10. A method, as claimed in claim 8, further including:

using a second holding assembly to hold said first communication device, with said second holding assembly being configured to operate with a third set of functionalities having more functionalities than said first set; and supporting communications by said interface module between said second holding assembly and said interface module including supporting said third set of functionalities.

11. A method, as claimed in claim 8, further including:

preparing a first communication at a site remote from the vehicle, said first communication involving a first vehicle subsystem in the vehicle and said first communication including a vehicle IP address associated with the vehicle, with said first vehicle subsystem being associated with first identifier-related information different from said vehicle IP address;

transmitting said first communication over the Internet to the vehicle using said vehicle IP address;

receiving said first communication by the vehicle;

determining in the vehicle that said first communication involves said first vehicle subsystem; and sending at least portions of said first communication to said first vehicle subsystem using said first vehicle subsystem identifier-related information.

12. A method for communicating involving an interface module having at least a first interface module processor, and a plurality of pockets including at least first and second pockets, said first and second pockets including a first pocket processor and a second pocket processor, respectively, said first pocket being used with a first telephone and said second pocket being used with a second telephone having at least physical characteristics different from the first telephone, comprising:

joining the first telephone with said first pocket;

generating a first voice command that is input to a microphone;

converting using said first interface module processor said first voice command to first digital command information in a common communications language used by said interface module;

sending said first digital command information to said first pocket using said common communications language;

translating said first digital command information from said common communications language to a first communications format compatible with the first telephone using said first pocket processor to produce a first telephone command signal; and providing said first telephone command signal to the first telephone using said first pocket processor;

wherein when said second pocket is joined with the second telephone and a second voice command is generated, said second voice command is converted to second digital command information in said common communications language and, after sending said second digital command information to said second pocket, said second pocket processor translates said second digital command information from said common communications language to a second communications format compatible with the second telephone and with said second communications format not being compatible with the first telephone.

13. A method, as claimed in claim 12, further including:

receiving at least one of analog audio signals and digital signals and when said analog audio signals are received, said first pocket manipulates said analog audio signals and when said digital signals are received said first pocket passes said digital signals directly to said interface module without manipulation.

14. A method, as claimed in claim 13, wherein:

said interface module performs signal processing on said analog audio signals including at least one of acoustic echo cancellation, line echo cancellation, noise reduction and frequency equalization.

15. A method, as claimed in claim 12, wherein:

said first pocket has a first set of functional capabilities and said second pocket has a second set of functional capabilities different from said first set and each of said first and second sets of functional capabilities being operable with said interface module and said second set of functional capabilities including related to at least two of the following: audible prompts, digital data, voice commands, text-to-speech, and voice memo recording.

16. A method, as claimed in claim 12, wherein:

said interface module and said first pocket are located in a vehicle having a vehicle ignition switch and a vehicle audio system and additional signals are provided including at least one of the following: a programming signal related to programming or re-programming said first processor, an ignition signal related to a position of the vehicle ignition switch and a mute signal related to muting an output from the vehicle's audio system.

17. A method, as claimed in claim 12, wherein:

said interface module is located in a vehicle having a number of vehicle subsystems including first and second vehicle subsystems and in which the vehicle has an Internet protocol (IP) address and said first vehicle subsystem has a first identifier and said second vehicle subsystem has a second identifier and, when communications are conducted involving the first vehicle subsystem, said IP address is used together with said first identifier and when communications are conducted involving the second vehicle subsystem, said IP address is used together with said second identifier.

18. A method, as claimed in claim 12, further including:

executing a text-to-speech module using said interface module.

19. A method, as claimed in claim 12, wherein:

said interface module is located in a vehicle having at least a first external subsystem and said interface module causes a translation to said common communications language based on a communication from said first external subsystem.

20. A method for communicating involving an interface module, having at least a first interface module processor, and a plurality of pockets including at least first and second pockets, said first pocket being used with a first telephone and said second pocket being used with a second telephone having at least physical characteristics different from the first telephone and in which said first pocket is unable to be used with the second telephone and said second pocket is unable to be used with the first telephone, comprising:

providing first voice command information with said interface module that is compatible with the first telephone and second voice command information that is compatible with the second telephone, with said first voice command information not being compatible with the second telephone and said second voice command information not being compatible with the first telephone;

joining said first pocket with the first telephone;

generating a first voice command that is input to a microphone;

obtaining said first voice command information using said interface module based on said first voice command; and sending said first voice command information to said first pocket using said interface module;

wherein when said second pocket is joined to the second telephone and a second voice command is generated, said second voice command information is obtained using said interface module and provided to said second pocket.

21. A method involving communications using a first communication device, a first holding assembly for holding said first communication device and an interface module, and with said first communication device, said first holding assembly and said interface module being electrically interconnected, said first holding assembly being configured to operate with a first set of functionalities and said interface module being configured to operate with a main set of functionalities, said first communication device being configured to operate with a second set of functionalities, said main set of functionalities including at least said first set of functionalities and said second set of functionalities, and with all of said first set of functionalities not being supported by said second set of functionalities and including the step of supporting communications between said first holding assembly and said interface module by said interface module including supporting said first set of functionalities.

* * * * *